US008955060B2

(12) United States Patent
Zhang et al.

(10) Patent No.: US 8,955,060 B2
(45) Date of Patent: Feb. 10, 2015

(54) COLLABORATIVE PARENTAL CONTROL OF STREAMING MEDIA

(71) Applicant: Verizon Patent and Licensing Inc., Basking Ridge, NJ (US)

(72) Inventors: Lei Zhang, Frisco, TX (US); Ming Chen, Bedford, MA (US); Dahai Ren, Lincoln, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 85 days.

(21) Appl. No.: 13/891,515

(22) Filed: May 10, 2013

(65) Prior Publication Data

US 2014/0338001 A1    Nov. 13, 2014

(51) Int. Cl.
*G06F 21/00* (2013.01)
*G06F 21/60* (2013.01)

(52) U.S. Cl.
CPC .................................. *G06F 21/604* (2013.01)
USPC ............................................. 726/4; 345/633

(58) Field of Classification Search
USPC ............................................................ 726/4
See application file for complete search history.

(56) References Cited

U.S. PATENT DOCUMENTS

| 7,685,642 | B2 * | 3/2010 | Gilliam et al. | 726/26 |
| 8,037,316 | B2 * | 10/2011 | Gudorf et al. | 713/186 |
| 8,825,809 | B2 * | 9/2014 | Soldan et al. | 709/219 |
| 2009/0222849 | A1 * | 9/2009 | Peters | 725/28 |

OTHER PUBLICATIONS

"Collaborative Filtering", http://en.wikipedia.org/wiki/Collaborative_filtering Mar. 13, 2013.
"Social Network", http://en.wikipedia.org/wiki/Social_network Mar. 16, 2013.
Xiwang Yang, Harald Steck, Yang Guo, and Yong Liu, "On Top-k Recommendation Using Social Networks", http://eeweb.poly.edu/faculty/yongliu/docs/Top-N-Recomm-tech-report.pdf Sep. 22, 2012.
Xiwang Yang, Yang Guo, and Yong Liu, "Bayesian-interference Based Recommendation in Online Social Networks", http://eeweb.poly.edu/faculty/yongliu/docs/SN_recomm_tdke.pdf Mar. 19, 2011.
Xiaoyuan Su, Taghi M. Khoshgogtaar, "A Survey of Collaborative Filtering Techniques", Advances in Artificial Intelligence, vol. 2009 (2009), Article ID 421425 http://www.hindawi.com/journals/aai/2009/421425/ Aug. 3, 2009.
C. Zheng, G. Shen, and S. Li, "Distributed Prefetching Scheme for Random Seek Support in Peer-to-Peer Streaming Applications", in Proc. of ACM Workshop on Advances in Peer-to-Peer Multimedia Streaming, Singapore, Nov. 11, 2005.

* cited by examiner

*Primary Examiner* — Peter Shaw
*Assistant Examiner* — Ali Shayanfar

(57) ABSTRACT

A network device receives a request for a selected video from a first user at a client device, and determines similarities between a second user associated with the first user and other parents in a collaborative community, wherein the similarities are determined based on the second user's, and the other users', prior censoring of videos. The network device obtains all exclusions applied by the second user, and the other users, in the collaborative community to the selected video, wherein each of the exclusions comprises a portion of the selected video identified for censoring by one of the users in the collaborative community. The network device further selectively applies each of the determined exclusions to the selected video based on the determined similarities, and sends the selected video, with the selectively applied exclusions, to the requesting first user at the client device.

21 Claims, 23 Drawing Sheets

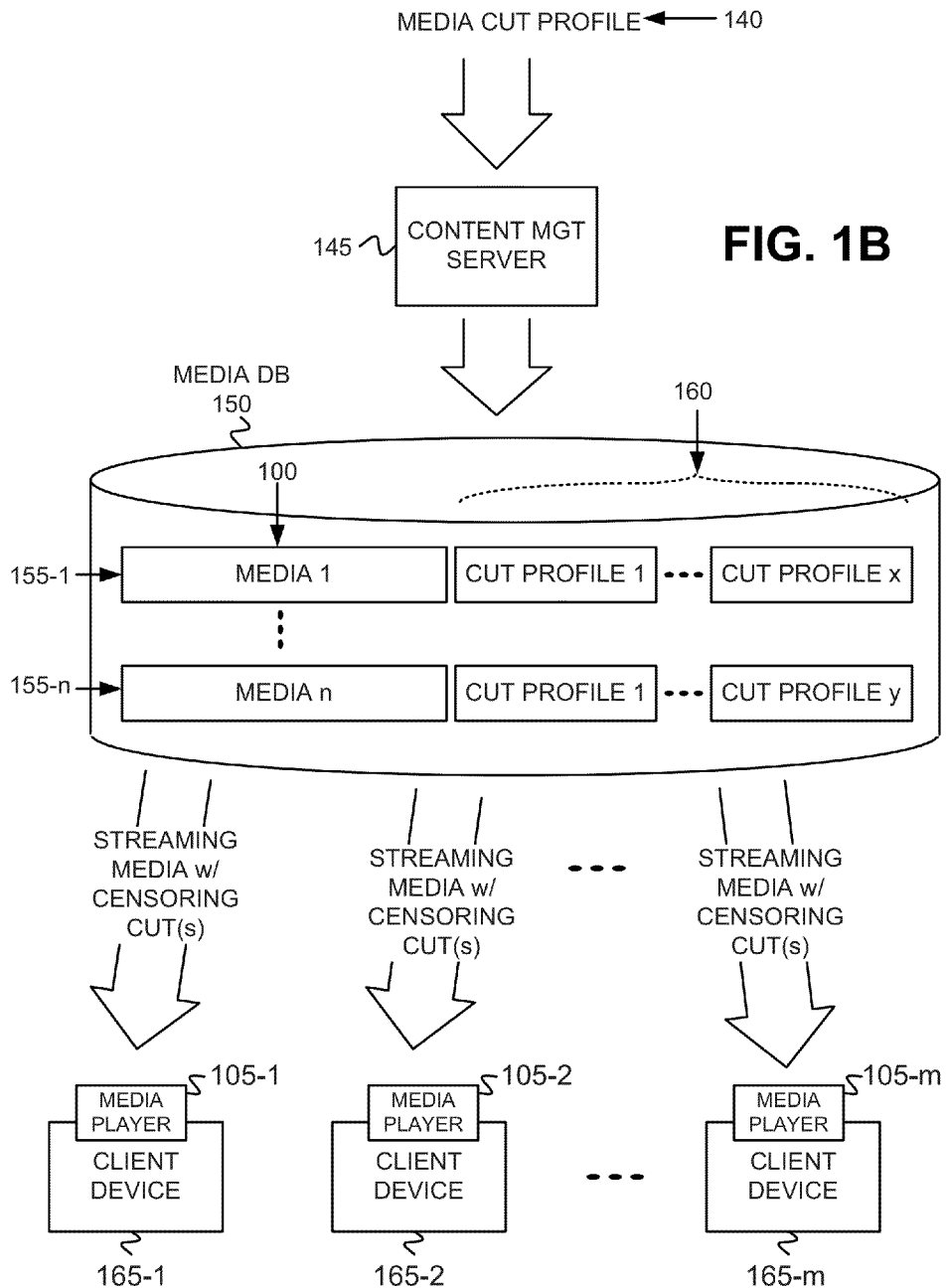

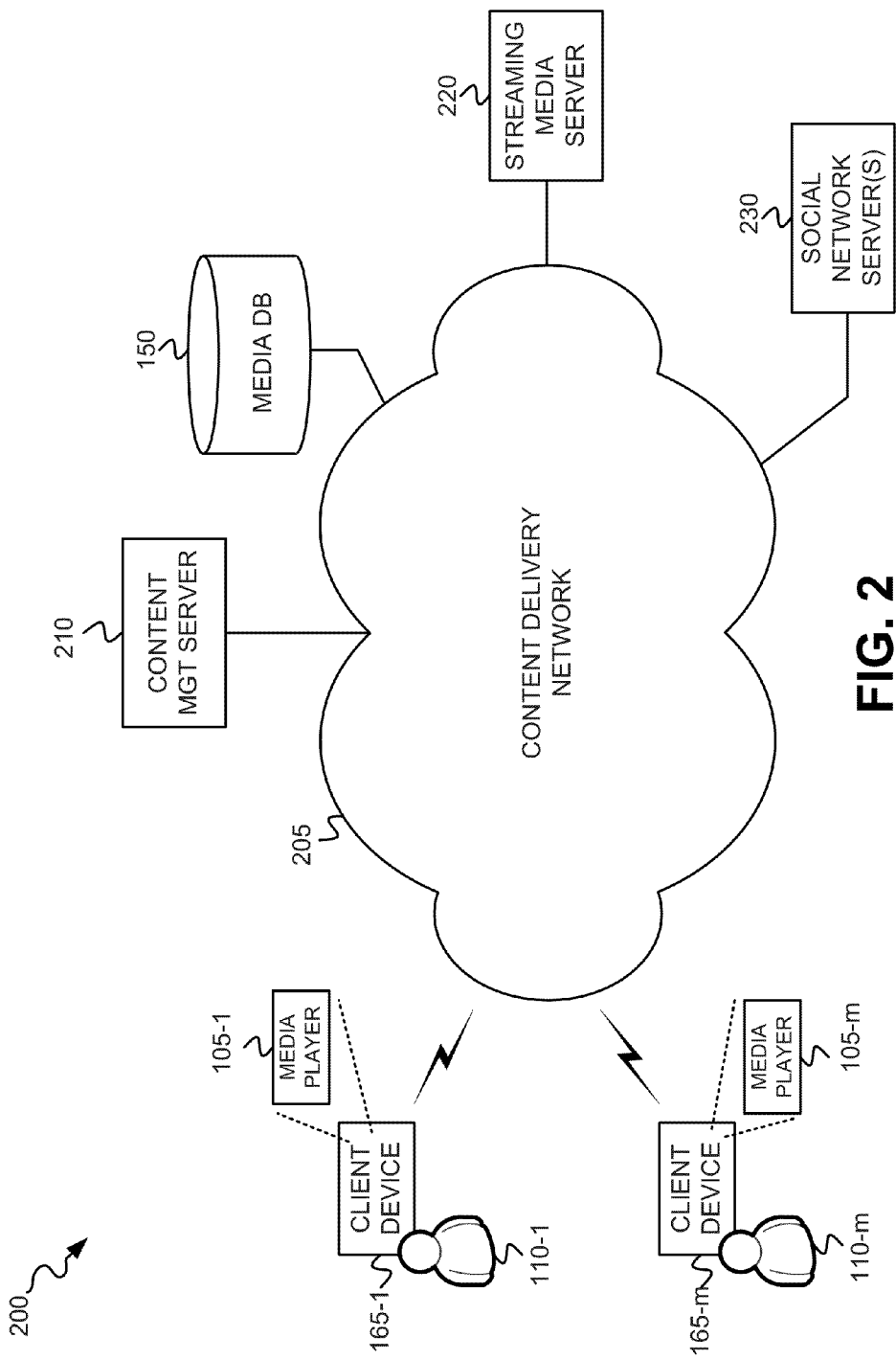

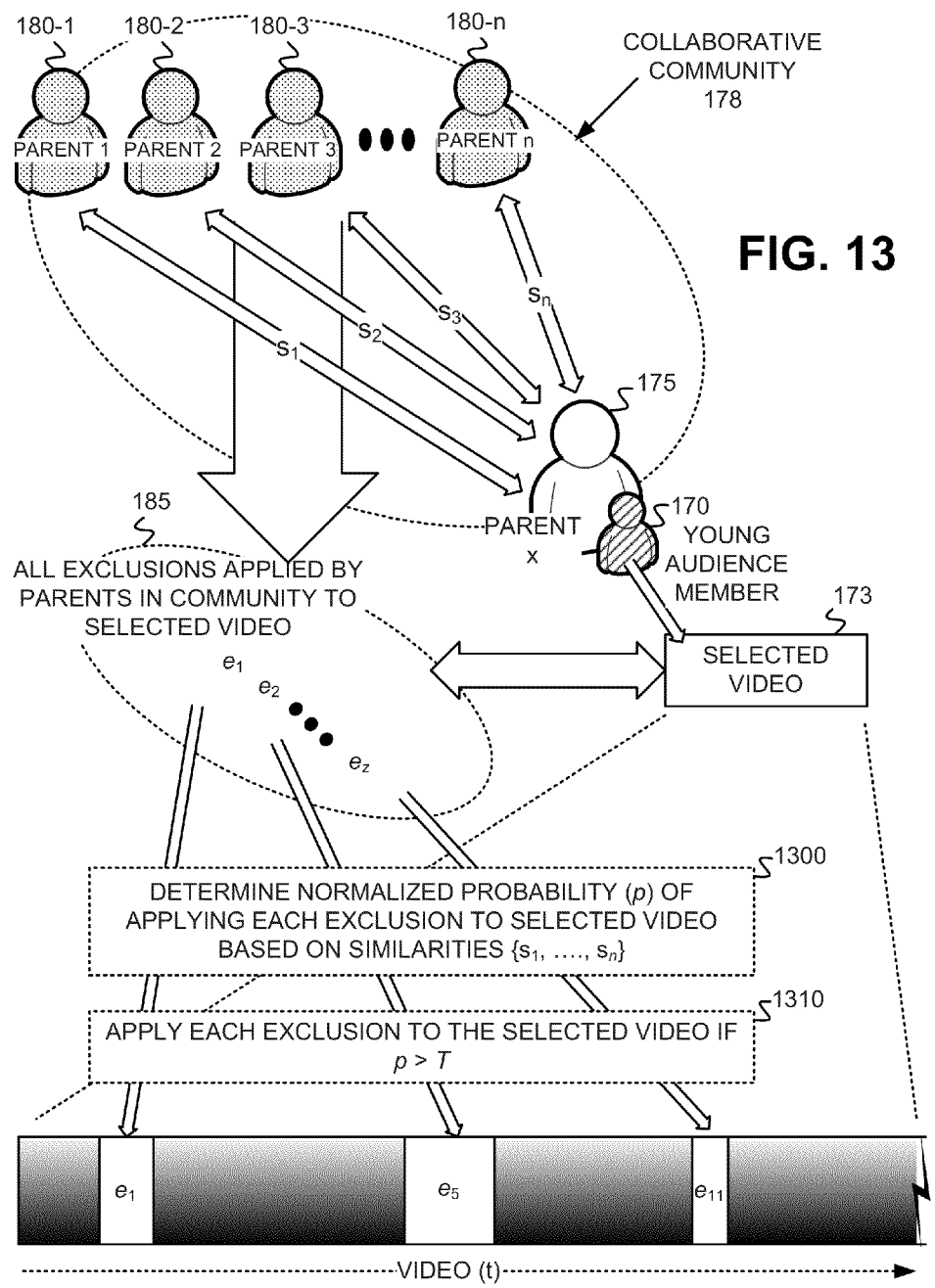

COLLABORATIVE PARENTAL CONTROL OF STREAMING MEDIA

BACKGROUND

Films are rated by authorized agencies or associations in terms of violence, sexuality, drug abuse, and other criteria. Ratings are used to determine the suitability of films among different age groups. For example, the Motion Picture Association of American (MPAA) is an American agency representing Hollywood studios. The primary MPAA ratings are: G (General audiences), PG (Parental guidance suggested/some material might not be suitable for children), PG-13 (Parents strongly cautioned/some material may be inappropriate for children under the age of 13), R (Restricted/under 17 not admitted without parent or adult guardian), and NC-17 (No one 17 and under admitted). Rating agencies exist in other countries also. It is often difficult to compare ratings between two countries because the ratings often reflect the subjective opinions of the board members of the rating agency. It is further difficult to compare ratings between two countries because the criteria adapted to determine the rating can vary widely between two different film rating systems. For example, violence is less a concern than sexual content in the United States, however, it is the opposite in many European countries. It is also difficult to compare ratings between two countries because the hierarchy of rating classifications also varies from country to country. For example, Belgium has only three classifications for movies, whereas Singapore has seven classifications and Britain has eight classifications.

Existing streaming movie providers allow parents to set parental controls from either the client or the server end. In an example of parental controls at the server end, parents can log on to a streaming on-line account and set the parental control level as PG so that any movie ranked above PG will be blocked from streaming from the server directly. In an example of parental controls at the client end, parents can create a client parental control password and set the parental control level at the client so that any movie ranked above PG will be grayed out by the client even though they are provided by the server. These existing mechanisms of parental control, however, sometime fail due to: 1) a movie with inappropriate content not being appropriately blocked and then being accessed by a young viewer; or 2) a movie without inappropriate content being blocked and not being able to be accessed by a young viewer.

BRIEF DESCRIPTION OF THE DRAWINGS

FIGS. 1A and 1B illustrate an overview of the censoring of streaming media at a media player by a user of the media player for future delivery and playback from a content delivery network;

FIG. 2 depicts an exemplary network environment in which user censored media may be stored in a content delivery network for future delivery to client devices;

FIG. 13 is a diagram that graphically depict aspects of the exemplary process of FIGS. 12A and 12B;

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Exemplary embodiments described herein permit individualized parental control of media content, including media content delivered by a media delivery service. A media player implemented at a client device, as described herein, includes functionality that allows a user (e.g., a parent or adult) to playback selected items of the media content, and designate, using an interface of the media player, portions of the media content to censor. During playback, the user may select, using the media player, censoring start and stop times along the timeline of the media content that define when censoring of the media content begins and when it ends. In addition to selecting the censoring start and stop times, the user may enter a reason that justifies censoring the portion of the media content. The censoring start and stop times, and the reason justifying the censoring, may be stored in a media cut profile that the user's client device may send to a remote content management server for storage in a media library in association with the uncensored media. The media cut profile may subsequently be used to censor the media content that is accessed and retrieved (e.g., by other users) from the media library.

Often, it may not be practical for parents to edit some or all of the media that may be watched, or listened to, by their children. Therefore, exemplary embodiments described herein use a collaborative effort between parents in a same collaborative community to edit/censor media content that their children may access and playback. The collaborative filtering approach described herein determines a media editing similarity and a social networking similarity between parents. The media editing similarity indicates whether two parents have similarly edited/censored the same media, and the social network similarity indicates whether two parents have close social connections. An overall similarity between a given parent, and other parents in the collaborative community may then be determined as, for example, a function of the media editing similarity and the social networking similarity. An item of media selected by a young audience member (e.g., a child) of a given parent may be selectively edited/censored based on the overall similarity between the given parent and other parents who have edited/censored the selected item of media in the past.

Figure 1A:
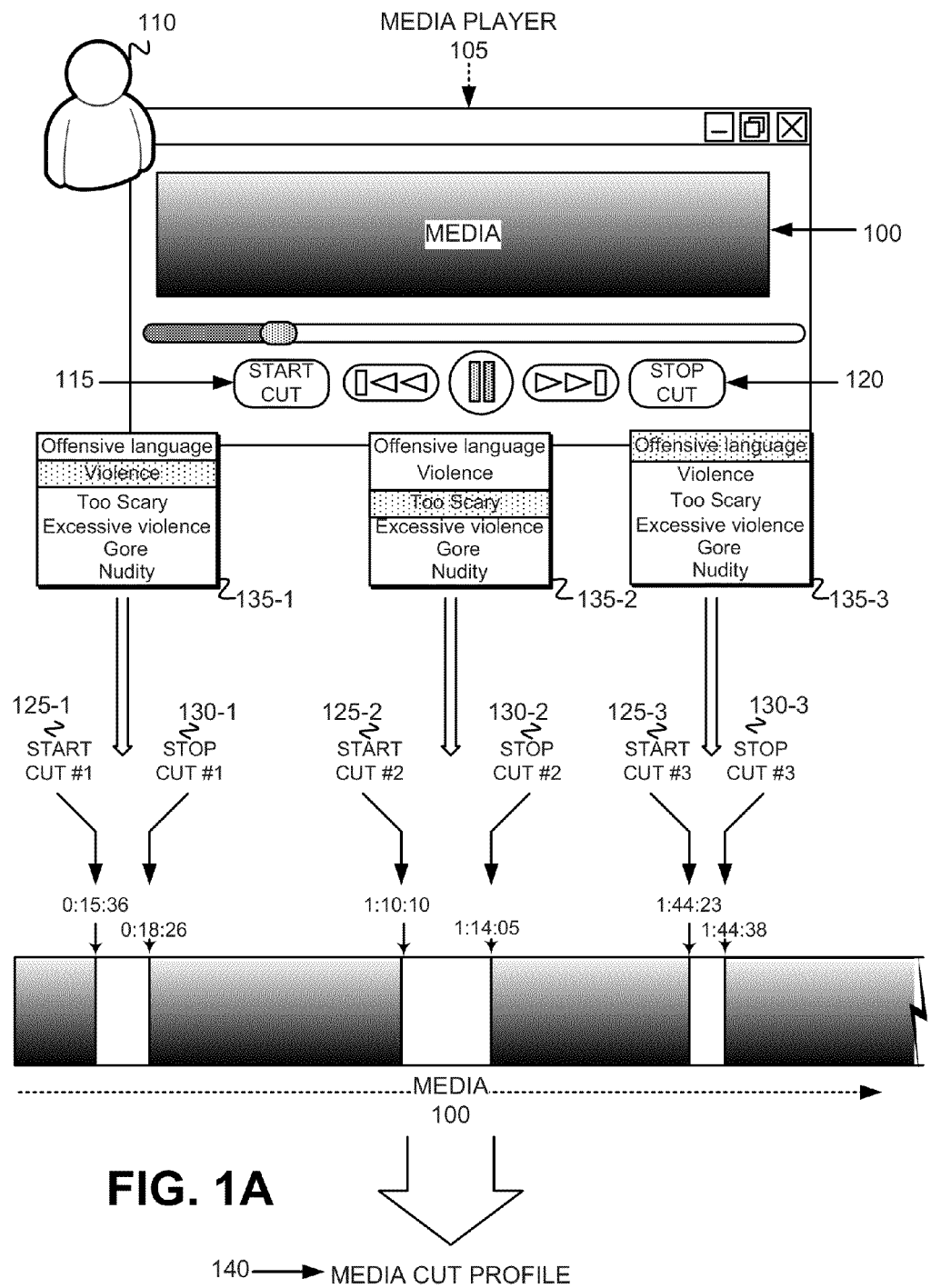

FIGS. 1A and 1B illustrate an overview of the censoring of media 100 at a media player 105 by a user 110 for future delivery and playback from a content delivery network (not shown). Media 100 may include audio media only (e.g., music), video media only, or audio and video media combined. User 110 may access media 100 via streaming of the media from the content delivery network for playback on media player 105. The content delivery network may stream the media to a client device (not shown) implementing media player 105 via, for example, Hypertext Transfer Protocol (HTTP) Live Streaming (HLS). Other media streaming protocols may, however, be used.

During playback, and based on user 110's subjective opinion of media 100 currently being played by media player 105, user 110 may select censoring start and censoring stop times via start cut button 115 and stop cut button 120 of media player 105. Selection of censoring start cut button 115 identifies when censoring begins, and selection of censoring stop cut button 120 identifies when censoring ends, during the media playback. The period of time between a start cut and a stop cut is referred to herein as an "exclusion." An exclusion, thus, represents a censored/edited portion of content that is to be excluded from playback of the media. For example, FIG. 1A depicts media 100 being censored at three separate locations along the timeline of media 100. At a time reference of 0:15:36, user 110 selects start cut button 115 to identify a start cut 125-1 at that time. At a time reference of 0:18:26, user 110 selects stop cut button 120 to identify a stop cut 130-1 at that time. The period of time between start cut 125-1 and stop cut 130-1 represents a period of playback time of media 100 that user 110 wishes to censor from media 100. The period of time between start cut 125-1 and stop cut 130-1 is referred to herein as an "exclusion" for media 100 (i.e., a portion of media to be excluded from media 100 when played back by a young audience member).

At a time reference of 1:10:10, user 110 selects start cut button 115 to identify a start cut 125-2 at that time. At a time reference of 1:14:05, user 110 selects stop cut button 120 to identify a stop cut 130-2 at that time. The period of time between start cut 125-2 and stop cut 130-2 represents another period of playback time of media 100 that user 110 wishes to censor from media 100. At a time reference of 1:44:23, user 110 selects start cut button 115 to identify a start cut 125-3 at that time. At a time reference of 1:44:38, user 110 selects stop cut button 120 to identify a stop cut 130-3 at that time. The period of time between start cut 125-3 and stop cut 130-3 represents a period of additional content that user 100 wishes to censor from media 100.

In addition to selecting time periods of content to censor from media 100, user 110 may enter a justification for censoring each cut portion of media 100. The justification may include, for example, reasons such as violence, excessive violence, gore, nudity, explicit language, offensive language, sexual situations, excessively scary or frightening, etc. In one implementation, upon selection of stop cut button 120 on media player 105, a graphical user interface (e.g., a text box (not shown)) may be presented in relation to media player 105 that permits user 110 to enter a justification for censoring the portion of content of media 100. In another implementation, shown in FIG. 1A, upon selection of stop cut button 120 on media player 105, a graphical user interface (e.g., a drop down menu) may be presented in relation to media player 105 that includes a list of reasons that user 110 may select from as a justification for censoring the portion of content of media 100. FIG. 1A depicts user 110 selecting "violence" from drop down menu 135-1 as a justification for censoring the period of content between start cut 125-1 and stop cut 130-1. FIG. 1A further depicts user 110 selecting "Too Scary" from drop down menu 135-2 as a justification for censoring the period of content between start cut 125-2 and stop cut 130-2. FIG. 1A additionally depicts user 110 selecting "Offensive language" from drop down menu 135-3 as a justification for censoring the period of content between start cut 125-3 and stop cut 130-3.

In an implementation in which media 100 includes both audio and video content, media player 105 may include functionality (e.g., a button) for selecting either audio, video, or both audio and video, for determining what aspect of the content is censored in the period of media 100 between a censoring start time (i.e., start cut 125) and a censoring stop time (i.e., stop cut 130). For example, user 110 may select "audio only" from media player 105, and only the audio (i.e., the video continues to play without the audio) will be censored during the period between the censoring start time and the censoring stop time. As another example, user 110 may select "video only" from media player 105, and only the video (i.e., the audio continues to play, but the video is blacked out) will be censored during the period between the censoring start time and the censoring stop time. As a further example, user 110 may select "audio and video" from media player 105, and both the audio and video will be censored during the period between the censoring start time and the censoring stop time (e.g., the media playback completely skips this portion of media 100).

When user 110's playback and censoring of media 100 is finished, all of the start cuts 125, and associated stop cuts 130, and the justification associated with each start cut/stop cut pair, may be stored in a media cut profile 140. Media cut profile 140 may additionally identify media 100. In some implementations, media cut profile 140 may identify user 110 who generated media cut profile 140 (i.e., the censoring user/parent).

As shown in FIG. 1B, subsequent to the creation of media cut profile 140, a client device (not shown) associated with media player 105 of FIG. 1A sends media cut profile 140 to a content management server 145 in the content delivery network (not shown). Upon receipt of media cut profile 140, content management server 140 may store media cut profile 140 in a media database (DB) 150 that stores multiple data structures 155-1 through 155-n. Each of data structures 155-1 through 155-n may store an original, uncensored version of media 100, and all of multiple cut profiles 160 associated with the corresponding media 100. Content management server 145, through access and retrieval of media 100 and media cut profiles 160 from media DB 150, may stream media, with selected censoring cuts, to client devices 165-1 through 165-m for playback via respective media players 105-1 through 105-m.

Figure 1C:
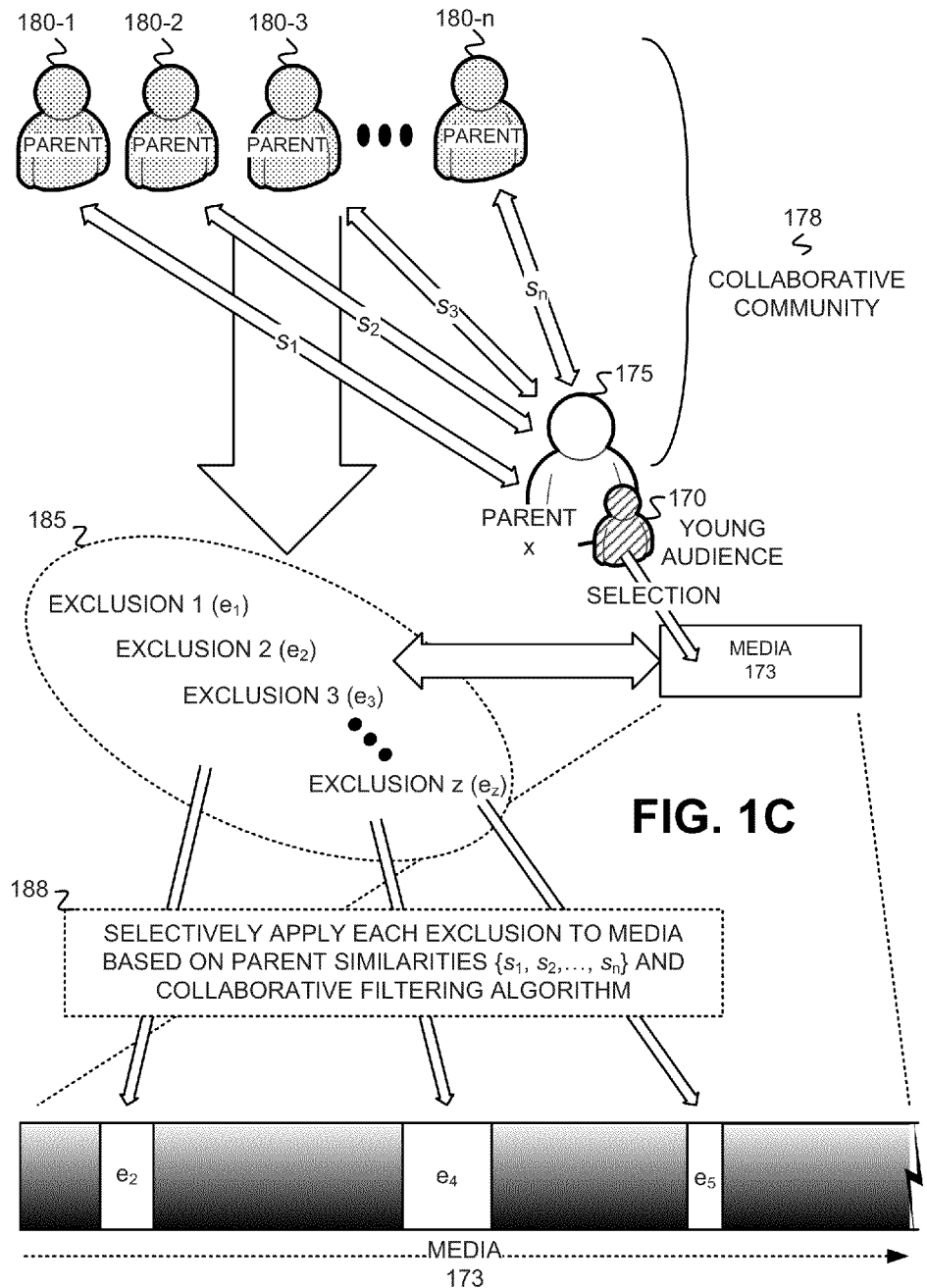
FIG. 1C illustrates an overview of parental control of streaming media using an exemplary collaborative parental filtering technique.

FIG. 1C illustrates an overview of collaborative parental control of streaming media using an exemplary collaborative filtering technique. As shown in FIG. 1C, a young audience member 170 associated with a parent x 175 may select an item of media 173 for viewing (e.g., playback). Media 173 may include audio only content, video only content, or combined audio and video content (referred to herein as just "video"). Young audience member 170 may be a child of parent x 175, or any user viewing media content using parent x 175's content delivery account. Parent x 175 is a member of a collaborative community 178 that also includes other parents 180-1 through 180-$n$ (where n>1). Collaborative community 178 may include a group of parents that have voluntarily chosen to join community 178. For example, collaborative community 178 may include a group of parents with similar religious or political views, or similar views about the kind of media content they wish their children to view. Alternatively, collaborative community 178 may include a group of parents that have been automatically determined, based on an analysis of the parents' profiles, media censoring choices, or media viewing habits. Though a single collaborative community 178 is shown in FIG. 1C, numerous different collaborative communities may exist, with each collaborative community having its own set of members. Parent x 175 and parents 180-1 through 180-$n$ may each correspond to user 110 in FIGS. 1A and 1B. "User" and "parent" are, therefore, used interchangeably herein. A "parent" as referred to herein may be a media editing/censoring user that maintains an account with a content delivery service, and other users (e.g., children, or other adults, or other "young audience members") may access media via the content delivery service using the parent's account. Therefore, a "user," as referred to herein (e.g., a first user) may also include an individual that accesses media via a content delivery service account of another user (e.g., a second user associated with the first user). In such a case, the first user may include a young audience member of child, and the second user may include an adult and/or parent.

Using video editing similarity values and social network similarity values between parent x 175 and each of parents 180-1 through 180-$n$, an overall parent similarity $\{s_1, s_2, \ldots, s_n\}$ may be determined between parent x 175 and each of parents 180-1 through 180-$n$. The video editing similarity values and the social network similarity values may be determined as described further below with respect to FIGS. 8A, 8B, 9 and 10. For example, an overall parent similarity value $s_1$ may be determined between parent x 175 and parent 180-1, an overall similarity value of $s_2$ may be determined between parent x 175 and parent 180-2, etc.

Through analysis of media DB 150, all exclusions 185 (i.e., censored portions of the media) applied by the parents in collaborative community 178 to selected media 173 may be determined. For example, all cut profiles applied to selected media 173 by parents in collaborative community 178 may be located and retrieved from media DB 150. Additionally, previously determined overall parent similarities $\{s_1, s_2, \ldots, s_n\}$ between parent x 175 and each of parents 180-1 through 180-$n$, as described with respect to FIGS. 8A, 8B, 9 and 10 below, may be retrieved. Each of exclusions 185 previously applied individually by parents in collaborative community 178 to selected media 173 may be selectively applied to media 173 based on the retrieved overall parent similarities $\{s_1, s_2, \ldots, s_n\}$ and based on an exemplary collaborative filtering algorithm, as described in further detail with respect to FIGS. 12A, 12B and 13 below. For example, if exclusions $e_1, e_2, e_3, e_4$ and $e_5$ have previously been applied individually to the selected media by parent x 175 and parents 180-1 through 180-$n$ of collaborative community 178, then exclusions $e_1, e_2, e_3, e_4$ and $e_5$ may be selectively applied, using the collaborative filtering algorithm described with respect to FIGS. 12A, 12B and 13 below, such that only exclusions $e_2, e_4$ and $e_5$ are applied to selected media 173 prior to delivery of media 173 to young audience member 170.

FIG. 2 depicts an exemplary network environment 200 in which user censored media may be stored in a content delivery network for future delivery to client devices 165-1 through 165-$m$. Network environment 200 may include a content delivery network (CDN) 205, a content management (mgt) server 210, media DB 150, a streaming media server 220, one or more social network servers 230, and client devices 165-1 through 165-$m$ (generically and individually referred to herein as "client device 165" and collectively referred to herein as "client devices 165"). Users 110-1 through 110-$m$ may each be associated with a respective one of client devices 165-1 through 165-$m$. As shown in FIG. 2, each client device 165 may execute a respective one of media players 105-1 through 105-$m$ (generically and individually referred to herein as "media player 105" and collectively referred to herein as "media player 105"). Users 110-1 through 110-$m$ may each correspond to parent x 175, parents 180-1 through 180-$n$, or young audience member 170 of FIG. 1C.

Content delivery network (CDN) 205 may include one or more networks including, for example, a wireless public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs), a telecommunications network (e.g., Public Switched Telephone Networks (PSTNs)), a local area network (LAN), a wide area network (WAN), a metropolitan area network (MAN), an intranet, the Internet, or a cable network (e.g., an optical cable network).

Content management server 210 may include a network device that receives media cut profiles from client devices 165 and stores the media cut profiles in a media library of media DB 150. In some implementations, content management server 210 may censor media based on a received media cut profile associated with the media. Content management server 210 may further determine video editing similarities, and parent social networking similarities, between parent x 175 and parents 180-1 through 180-$n$ of collaborative community 178 to determine overall parent similarities $\{s_1, s_2, \ldots, s_n\}$. Content management server 210 may selectively apply exclusions to an item of media selected by a young audience member based on a collaborative filtering technique, as described above with respect to FIG. 1C and below with respect to FIGS. 12A, 12B and 13.

Media DB 150 may include a network device that stores data structures that further store uncensored media and associated media cut profiles (i.e., sets of exclusions). In some implementations, the data structures may additionally store media that have been censored based on the media cut profiles. Media DB 150 may further store data structures that store overall parent similarities $\{s_1, s_2, \ldots, s_n\}$ between parent x 175 and parents 180-1 through 180-$n$ of collaborative community 178.

Streaming media server 220 may include a network device that retrieves media and streams the media to requesting users at client devices 165. In some implementations, the retrieved media may include uncensored media and, in addition to streaming the media to the client devices 165, streaming media server 220 may send selected exclusions which, upon receipt at the requesting user's client device 165, media player 105 may use to censor the media during playback. In other implementations, content management server 210 may censor the media based on the selected exclusions and may stream the censored media to the requesting user's client device 165 either directly, or via streaming media server 220.

Social network server(s) 230 may include one or more network devices that implement social network services (e.g., Twitter, Facebook, LinkedIn, Ning). Social network server(s) may maintain social network accounts, including social networking data, for users 110-1 through 110-*m* (e.g., parent x 175, parents 180-1 through 180-*n*). The social network accounts, including social networking data, may be accessed and retrieved directly by content management server 210 from social network service server(s) 230, or retrieved from client devices 165 by content management server 210 when a respective user accesses the user's social network account at a respective client device 165.

Client device 165 may include any type of electronic device that may play media (e.g., audio and/or video media) and that may connect with CDN 205 via a wired or wireless connection. Client device 165 may include, for example, a digital media playing device (e.g., a MP3 player), a cellular telephone (e.g., a smart phone), a personal digital assistant (PDA), a computer (e.g., tablet, desktop, palmtop, or laptop), or a set-top box (STB) involved in delivering media via a cable or satellite network to user 110.

The configuration of network components of network environment 200 illustrated in FIG. 2 is for illustrative purposes. Other configurations may be implemented. Therefore, network environment 200 may include additional, fewer and/or different components that may be configured in a different arrangement than those depicted in FIG. 2.

Figure 3:
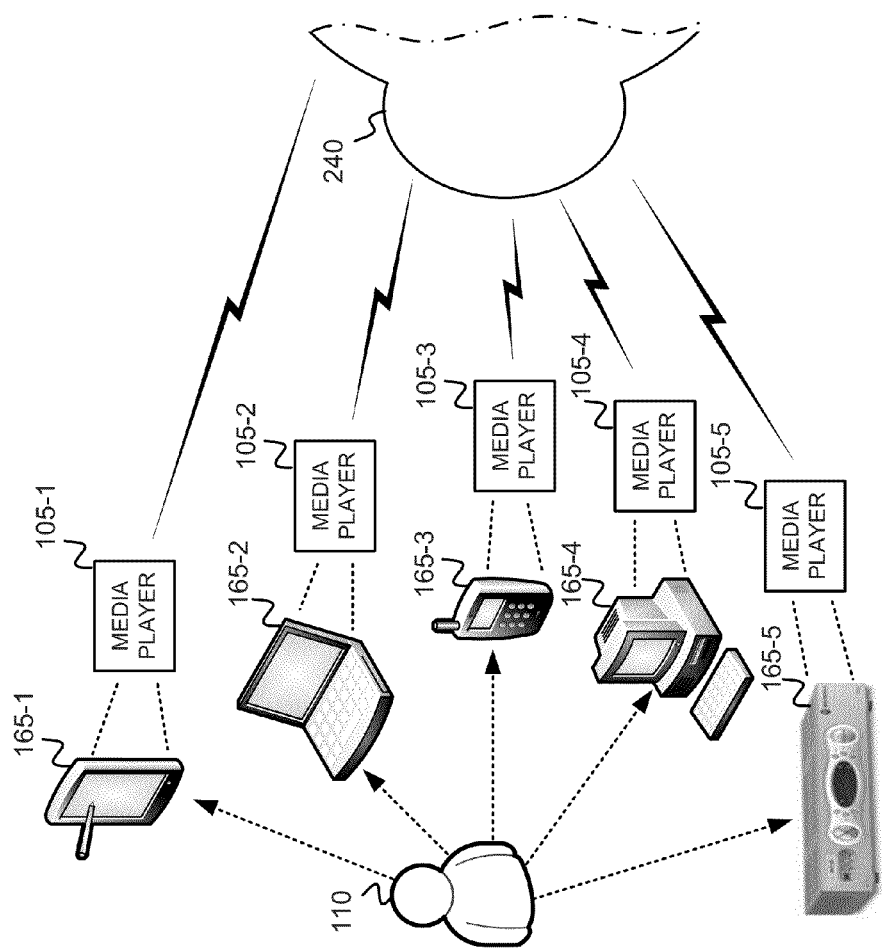
FIG. 3 depicts some specific examples of client devices used in the network environment of FIG. 2.

FIG. 3 depicts some specific examples of client devices 165-1 through 165-5 used in network environment 200. As shown, user 110 may use one or more of multiple different client devices 165-1 through 165-5, where each of the client devices may implement a respective one of media players 105-1 through 105-*m* for playing streaming media. In the specific examples depicted in FIG. 3, client device 165-1 may include a tablet computer, client device 165-2 may include a laptop computer, client device 165-3 may include a smart phone, client device 165-4 may include a desktop computer, and client device 165-5 may include a set-top box (STB).

Figure 4:
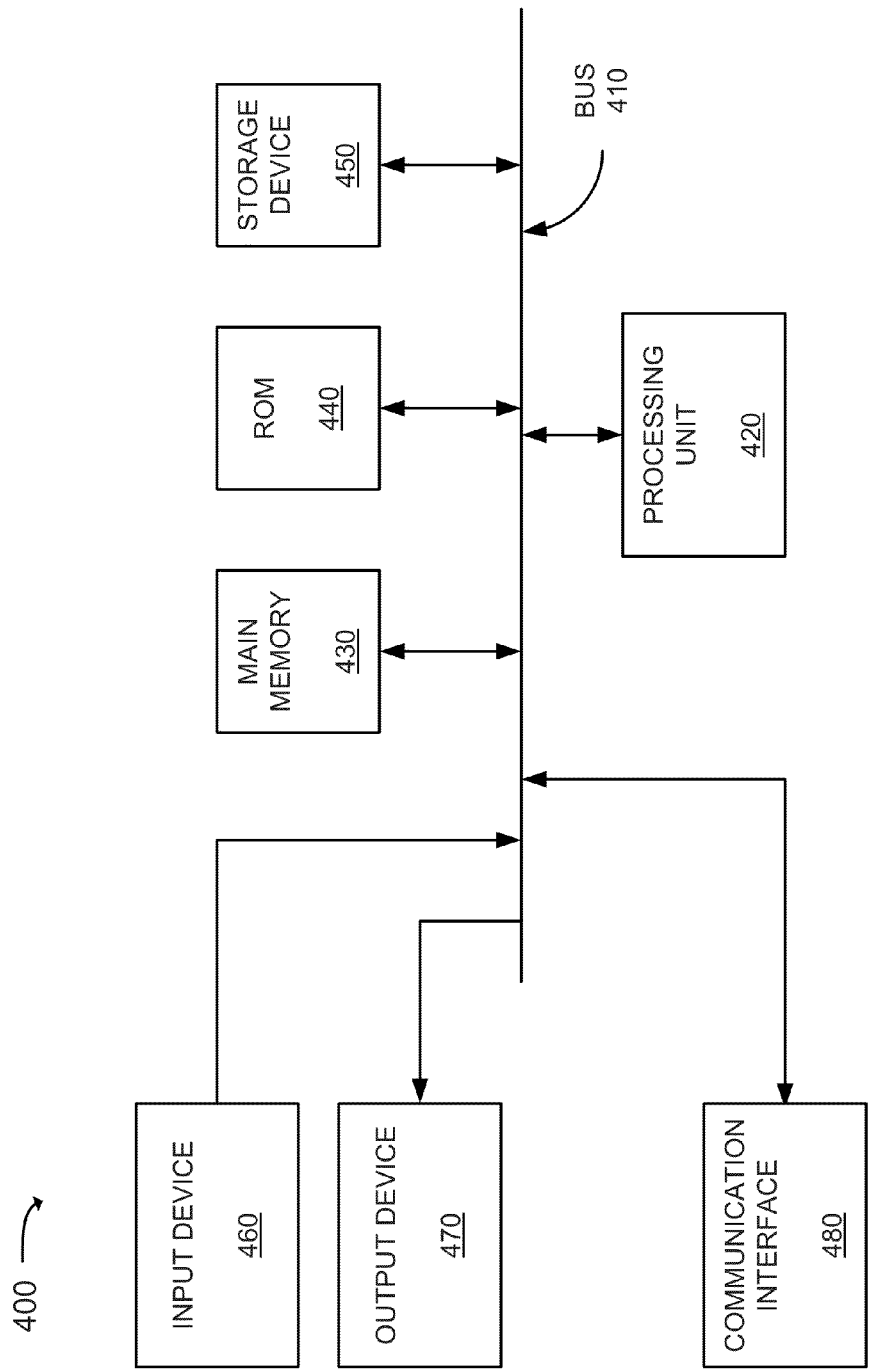
FIG. 4 is a diagram that depicts exemplary components of a device that may correspond to a client device, a content management server, a media database, or a streaming media server of FIG. 2.

FIG. 4 is a diagram that depicts exemplary components of a device 400. Client device 165, content management server 210, media DB 150, streaming media server 220, and social network server(s) 230 may each be configured identical to, or similar to, device 400. Device 400 may include a bus 410, a processing unit 420, a main memory 430, a read only memory (ROM) 440, a storage device 450, an input device 460, an output device 470, and a communication interface 480. Bus 410 may include a path that permits communication among the components of device 400.

Processing unit 420 may include one or more processors or microprocessors, or processing logic, which may interpret and execute instructions. Main memory 430 may include a random access memory (RAM) or another type of dynamic storage device that may store information and instructions for execution by processing unit 420. ROM 440 may include a ROM device or another type of static storage device that may store static information and instructions for use by processing unit 420. Storage device 450 may include a magnetic and/or optical recording medium. Main memory 430, ROM 440 and storage device 450 may each be referred to herein as a "tangible, non-transitory computer-readable medium." The processes/methods described herein can be implemented as instructions that are stored in main memory 430, ROM 440 and/or storage device 450 for execution by processing unit 420.

Input device 460 may include one or more mechanisms that permit an operator to input information to device 400, such as, for example, a keypad or a keyboard, a display with a touch sensitive panel, voice recognition and/or biometric mechanisms, etc. Output device 470 may include one or more mechanisms that output information to the operator, including a display, a speaker, etc. Input device 460 and output device 470 may, in some implementations, be implemented as a user interface (UI) that displays UI information and which receives user input via the UI. Communication interface(s) 480 may include a transceiver that enables device 400 to communicate with other devices and/or systems. For example, communication interface(s) 480 may include wired or wireless transceivers for communicating via content delivery network 205.

The configuration of components of device 400 illustrated in FIG. 4 is for illustrative purposes. Other configurations may be implemented. Therefore, device 400 may include additional, fewer and/or different components than those depicted in FIG. 4.

Figure 5A:
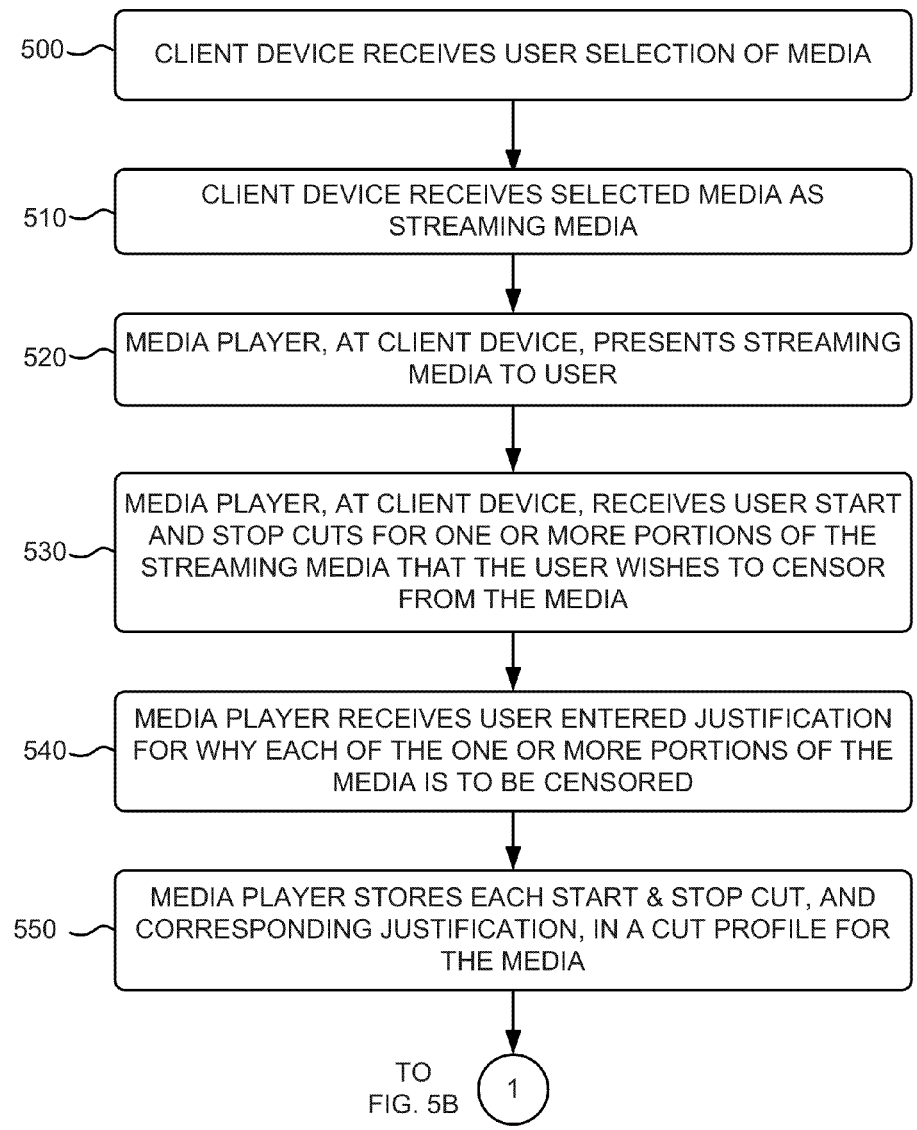
FIGS. 5A and 5B are flow diagrams of an exemplary process for user-selected censoring of media stored in a content delivery network using a client device's media player.
Figure 5B:
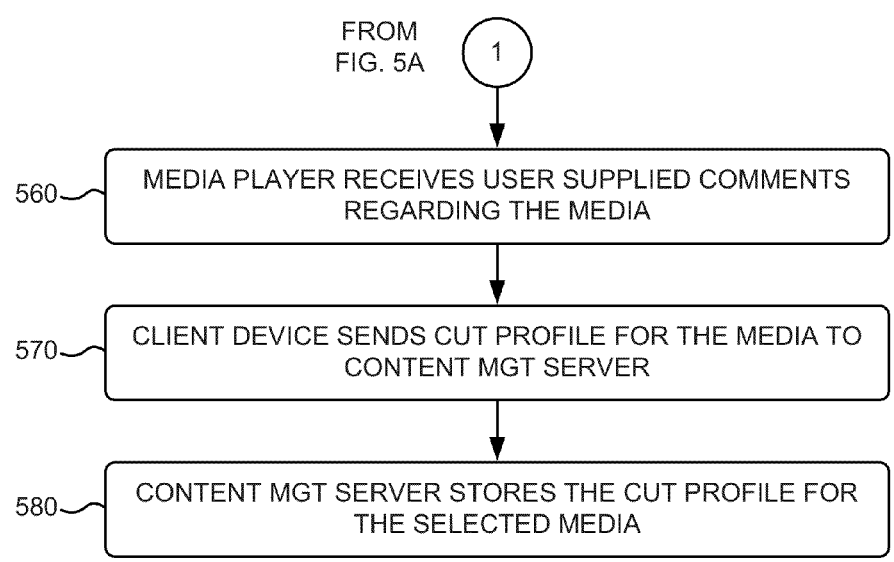

FIGS. 5A and 5B are flow diagrams of a first exemplary process for user-selected censoring of media stored in a content delivery network using a client device's media player. The exemplary process of FIGS. 5A and 5B may be implemented by client device 165, in conjunction with content management server 210. The exemplary process of FIGS. 5A and 5B is described below with reference to the diagrams of FIGS. 2, 6 and 7.

The exemplary process may include client device 165 receiving a user selection of media (block 500). User 110 may, via interaction with streaming media server 220, access and retrieve selected media from a media library stored in media DB 150. The media library may store media that has been previously rated by a rating authority (e.g., the MPAA). Media stored in the media library may include media that is rated as appropriate, or inappropriate, for a young audience, such as, for example, media that is rated R or PG-13. User 110 may correspond to parent x 175, or one of parents 180-1 through 180-*n*. Client device 165 may receive the selected media as streaming media (block 510). Upon user selection of the media via interaction with streaming media server 220, streaming media server 220 may retrieve the selected media from media DB 150, and stream the media to client device 165. Streaming media server 220 may stream the selected media to client device 165 using, for example, HLS.

Figure 6:
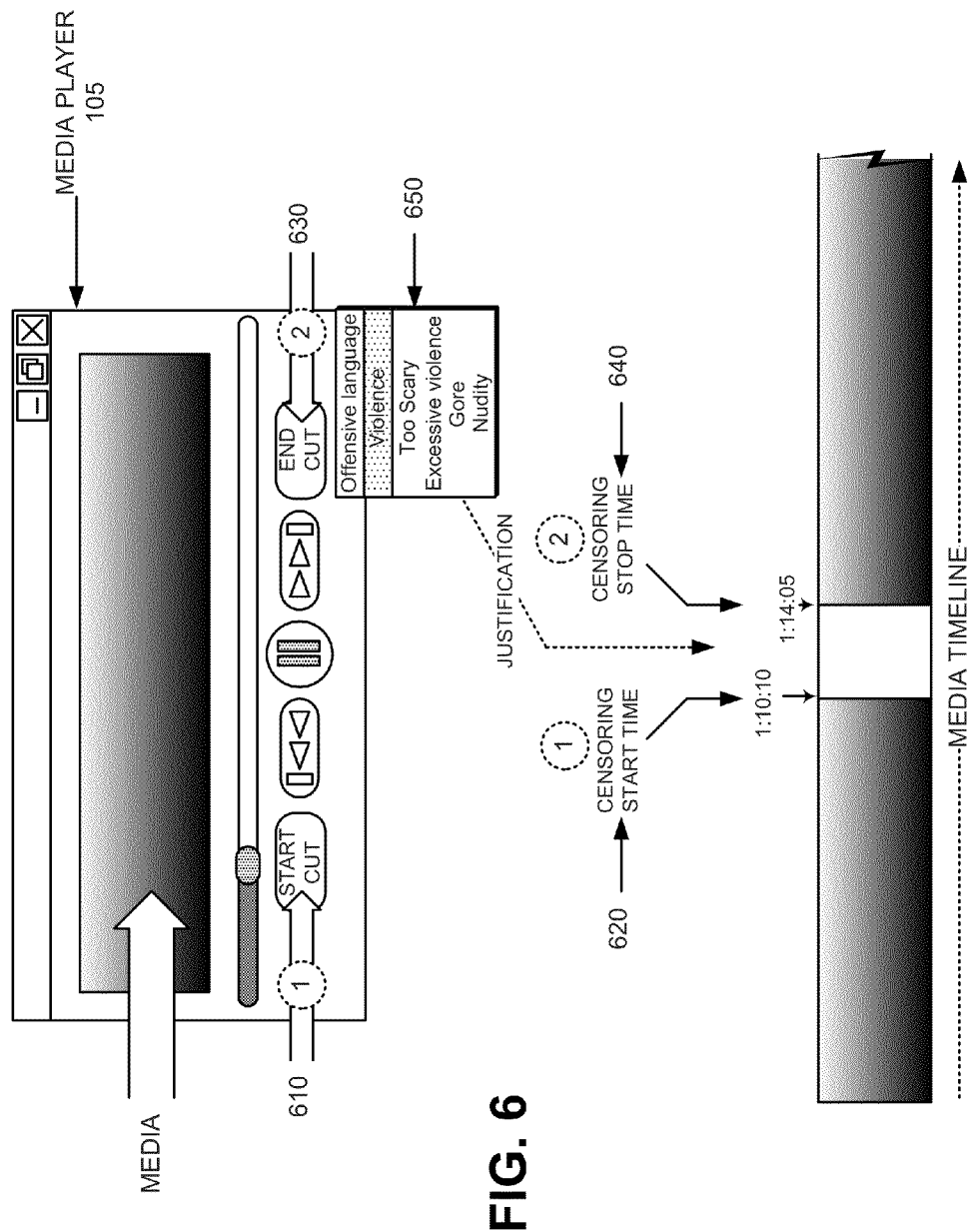
FIG. 6 is a diagram that depicts an example of the user-selected censoring of media of the exemplary process of FIGS. 5A and 5B.

Media player 105, at client device 165, may present the streaming media to user 110 (block 520). FIG. 6 depicts media player 105 displaying media 600 to user 110 (not shown). Media player 105, at client device 165, may receive user start and stop cuts for one or more portions of the streaming media that the user wishes to censor from the media (block 530). During playback of media 600, user 110 may, as shown in FIG. 6, select 610 the "start cut" button to mark a censoring start time 620 along the media timeline of media 600. As playback continues, user 110 may, as also shown in FIG. 6, select 640 the "stop cut" button to mark a censoring stop time 640 along the media timeline of media 600. Media player 105, at client device 165, may receive a user entered justification for why each of the one or more portions of the media is to be censored (block 540). In one implementation, upon selection 640 of the "stop cut" button, as shown in FIG. 6, media player 105's user interface may present a drop down menu 650 that displays multiple different reasons that justify user 110's censoring of media 600 over the portion of media 600 between censoring start time 620 and censoring stop time 640. The reasons presented in drop down menu 650 may include, but are not limited to, explicit language, offensive language, nudity, sexual situations, gore, violence, excessive violence, and being too scary. In another implementation (not shown in FIG. 6), media player 105's user interface may present a dialogue box into which user 110 may enter a reason justifying censoring the portion of media 600 between censoring start time 620 and censoring stop time 640.

Figure 7:
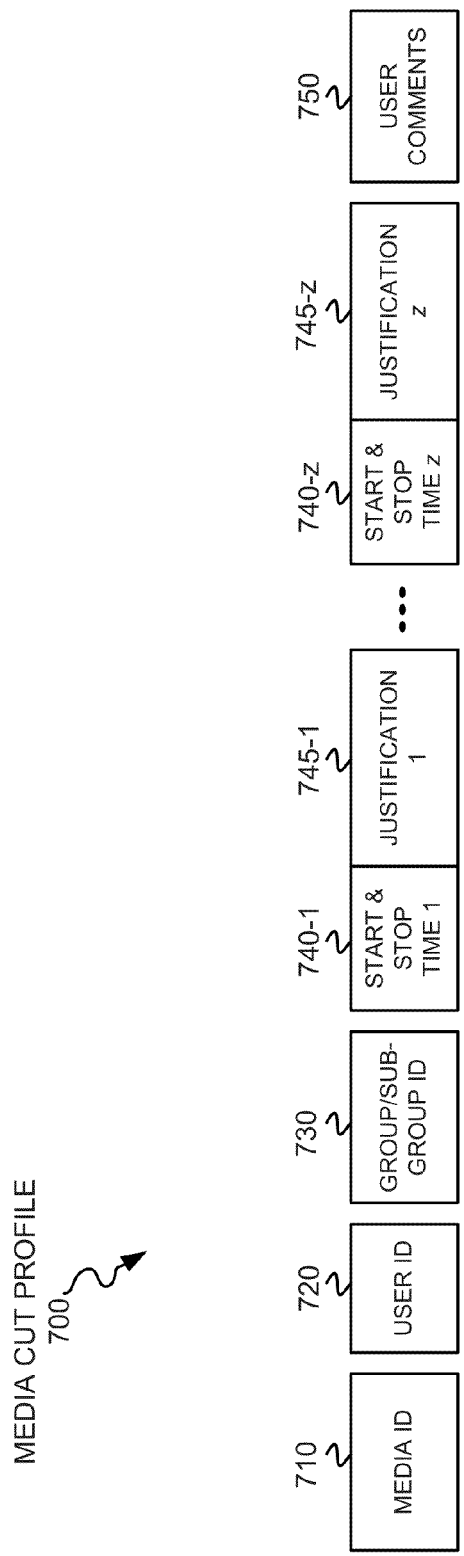
FIG. 7 depicts an exemplary implementation of a media cut profile associated with a given media.

Media player 105, at client device 165, may store each start and stop cut, and corresponding justification, in a cut profile for the media (block 550). FIG. 7 depicts an exemplary implementation of a media cut profile 700 for an item of media. As shown, a field that includes a censoring start and stop time 740-1 is stored in media cut profile 700 in association with data that includes a unique identifier 710 for the media, and a unique identifier 720 for user 110 that created media cut profile 700. The unique identifier 720 for user 110 may be, for example, stored at client device 165 and provided in conjunction with the start and stop cut and justification in block 550. In some implementations, media cut profile 700 may additionally store a group or sub-group identifier associated with the user identified by user ID 720. The user identified by user ID 720 may belong to a group or sub-group of users in a community of users (e.g., who have similar interests, or similar values for purposes of media censoring). For example, media cut profile 700 may store an identifier of a collaborative community 178 of which the user identified by user ID 720 is a member. As shown in FIG. 7, media cut profile 700 may include multiple start and stop times 740-1 through 740-z (where z>1), and corresponding justifications 745-1 through 745-z, for each portion of media 600 to be censored. Each start and stop time 740-1 through 740-z represents an "exclusion" for the media identified by media ID 710. The number and content of the fields of media cut profile 700, shown in FIG. 7, is for illustrative purposes. Each media cut profile 700 may include additional, fewer and/or different fields than those depicted in FIG. 7.

Referring to FIG. 5B, media player 105, at client device 165, may receive user supplied comments regarding the media (block 560). User 110 may wish to enter their own overall comments related to the content of the media that may be stored in media cut profile 700. For example, user 110 may believe that the media should have been more appropriately rated PG-13, instead of PG, or vice-versa. FIG. 7 depicts user 110's comments stored in field 750 of media cut profile 700.

Client device 165 may send the cut profile for the media to content management server 210 (block 570). Client device 165 may send media cut profile 700 for the media to content management server 210 via CDN 205 as soon as playback, and censoring, of the media by user 110 is completed. Alternatively, client device 165 may send one or more media cut profiles at specific intervals (e.g., twice a day, every hour, etc.) in batches. Content management server 210 may white list the received cut profile for the selected media (block 580). Content management server 210 may store the selected media in the media library of media DB 150

The exemplary process of FIGS. 5A and 5B may be selectively repeated for each selection of media, and censoring of the media, performed by one or more users 110 at a respective client device 165. For example, client device 165 may perform the exemplary process of FIGS. 5A and 5B for multiple different selected items of media. As another example, two different client devices 165 may each perform the exemplary process of FIGS. 5A and 5B for a same selected item of media, or for two different selected items of media.

Figure 8A:
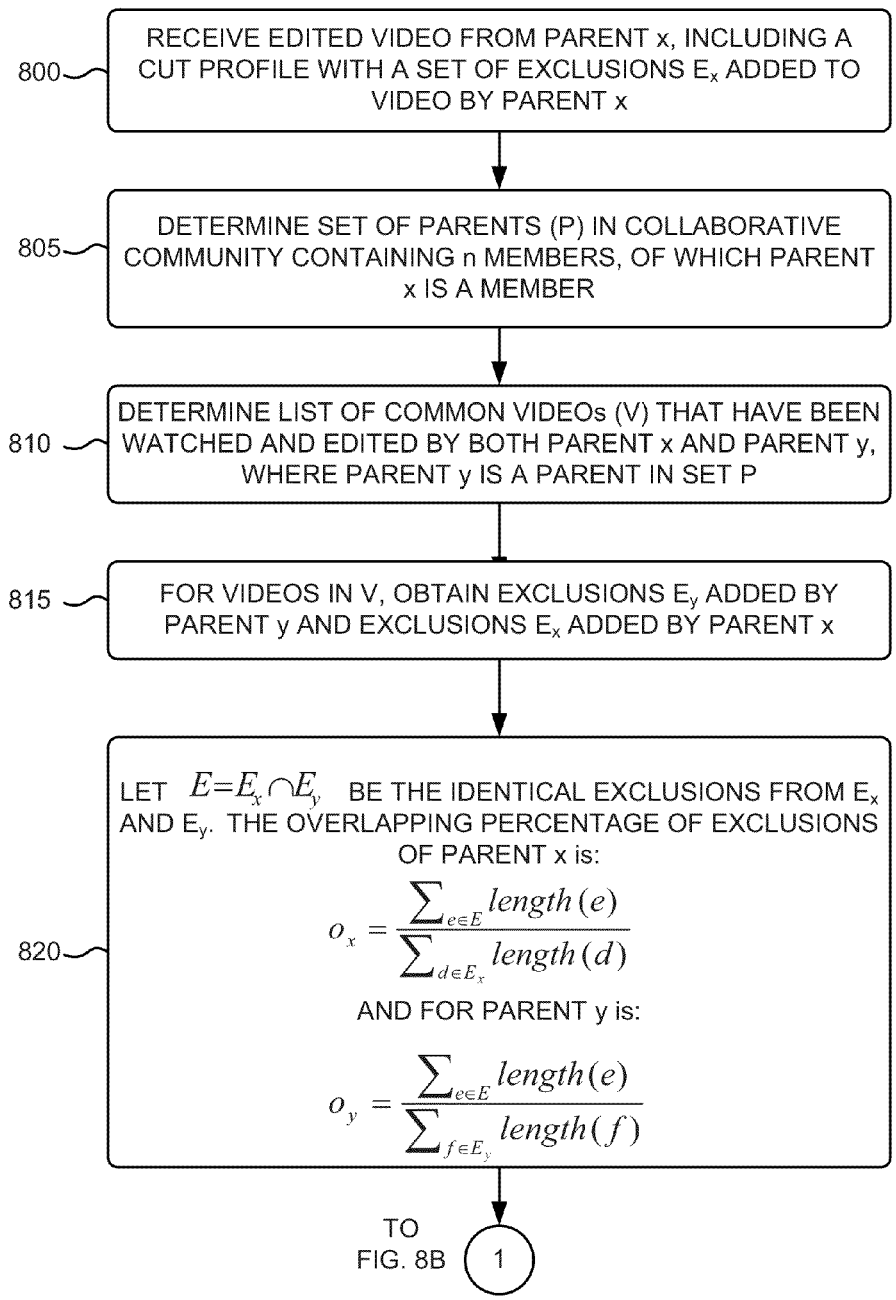
FIGS. 8A and 8B are flow diagrams of an exemplary process for determining an overall parent similarity s between a parent x and one or more other parents in a collaborative community.
Figure 8B:
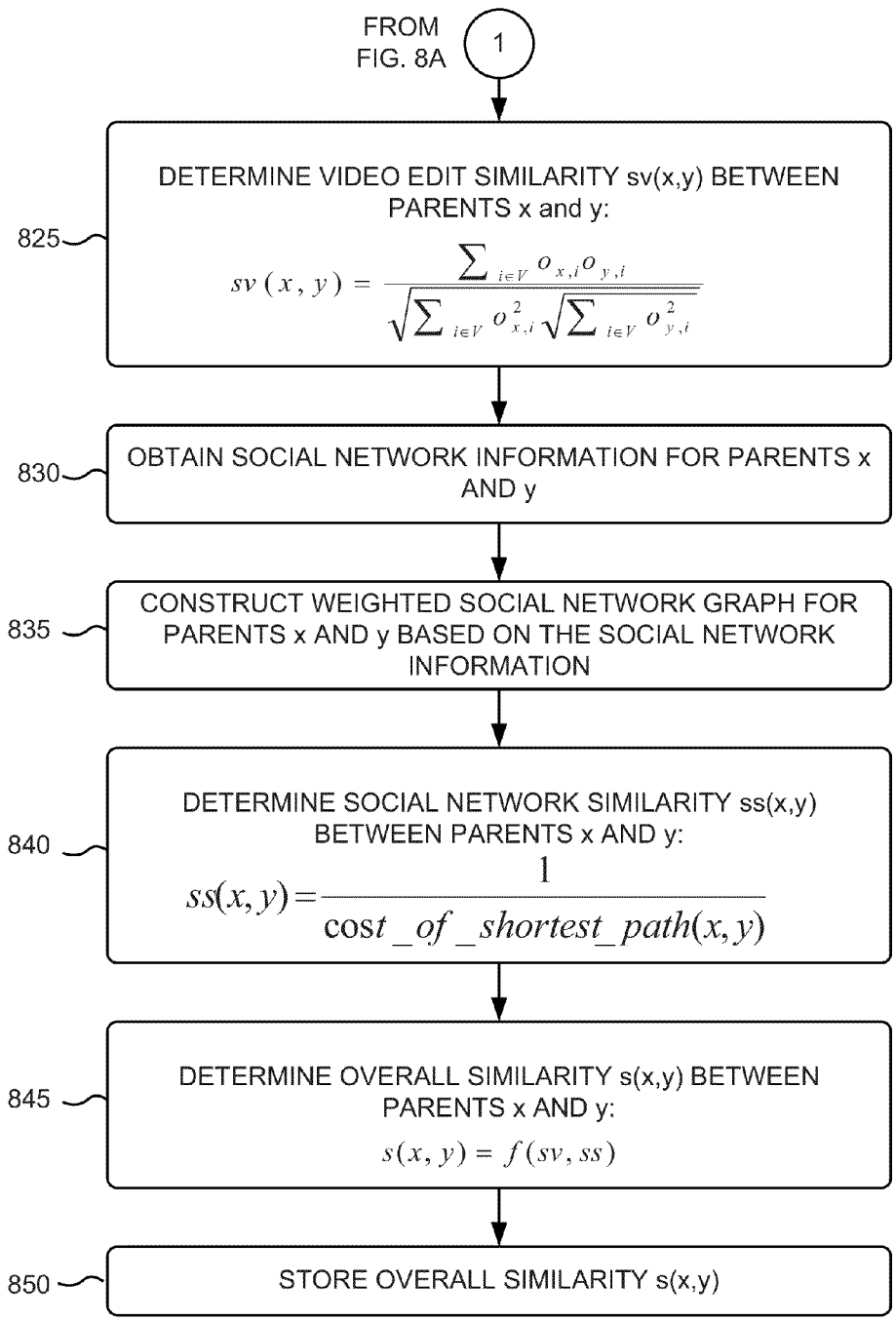

FIGS. 8A and 8B are flow diagrams of an exemplary process for determining an overall parent similarity s between parent x 175 and one or more other parents 180-1 through 180-n of collaborative community 178. The overall parent similarity s between parent x 175 and one or more other parents 180-1 through 180-n may include a video editing similarity that indicates whether two parents have similarly edited/censored the same videos, and a social network similarity that indicates whether two parents have close social connections. The exemplary process of FIGS. 8A and 8B may be implemented by content management server 210. The exemplary process of FIGS. 8A and 8B is described below with reference to the diagrams of FIGS. 2 and 9-11. The description of FIGS. 8A and 8B refers to a "video," meaning a combined audio and video item of media content. However, the exemplary process of FIGS. 8A and 8B may be applied to audio only, or video only, items of media content.

Figure 9:
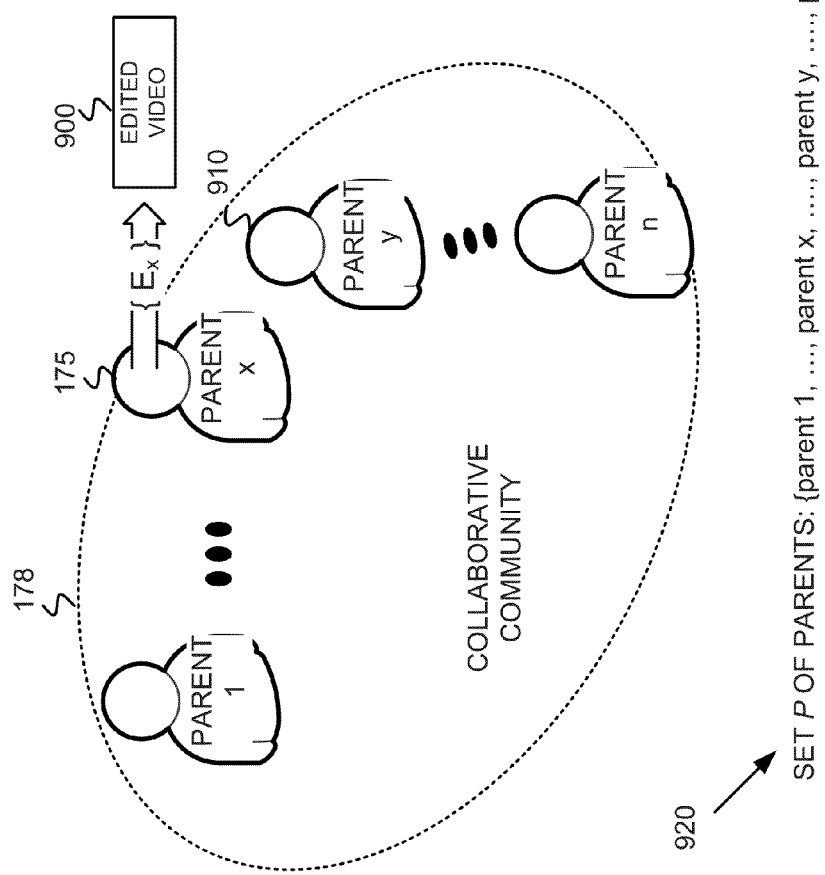
FIGS. 9, 10A, 10B, and 11 are diagrams that graphically depict aspects of the exemplary process of FIGS. 8A and 8B.

Referring to FIG. 8A, the exemplary process may include receiving edited/censored video content from parent x 175, including a cut profile with a set of exclusions $E_x$ added to the video by parent x 175 (block 800). Block 800 may correspond, for example, to blocks 500 through 580 of FIGS. 5A and 5B. FIG. 9 depicts parent x 175 providing a set of exclusions $E_x$ in conjunction with an edited video 900.

Content management server 210 may determine a set of parents (P) in a collaborative community containing n members, of which parent x is a member (block 805). FIG. 9 depicts a collaborative community 178 of which parents 1 through n, including parent x 175 and parent y 910 are members. The set P 920 includes all of the parents in collaborative community 178: {parent 1, . . . , parent x, . . . , parent y, . . . , parent n}, in which parent 1 and parent x may be one and the same parent, and parent y and parent n may be one and the same parent (i.e., the set P may only consist of parent x and parent y). Blocks 810 through 850, described below, may be repeated for each parent in set P of the collaborative community 178. Therefore, at each iteration of blocks 810 through 850, the value of y for parent y may range from 1 to n. For example, at the first iteration of blocks 810-850, y would equal 1 and parent y would be parent 1, at the second iteration of blocks 810-850, y would equal 2 and parent y would be parent 2, etc.

Figure 10A:
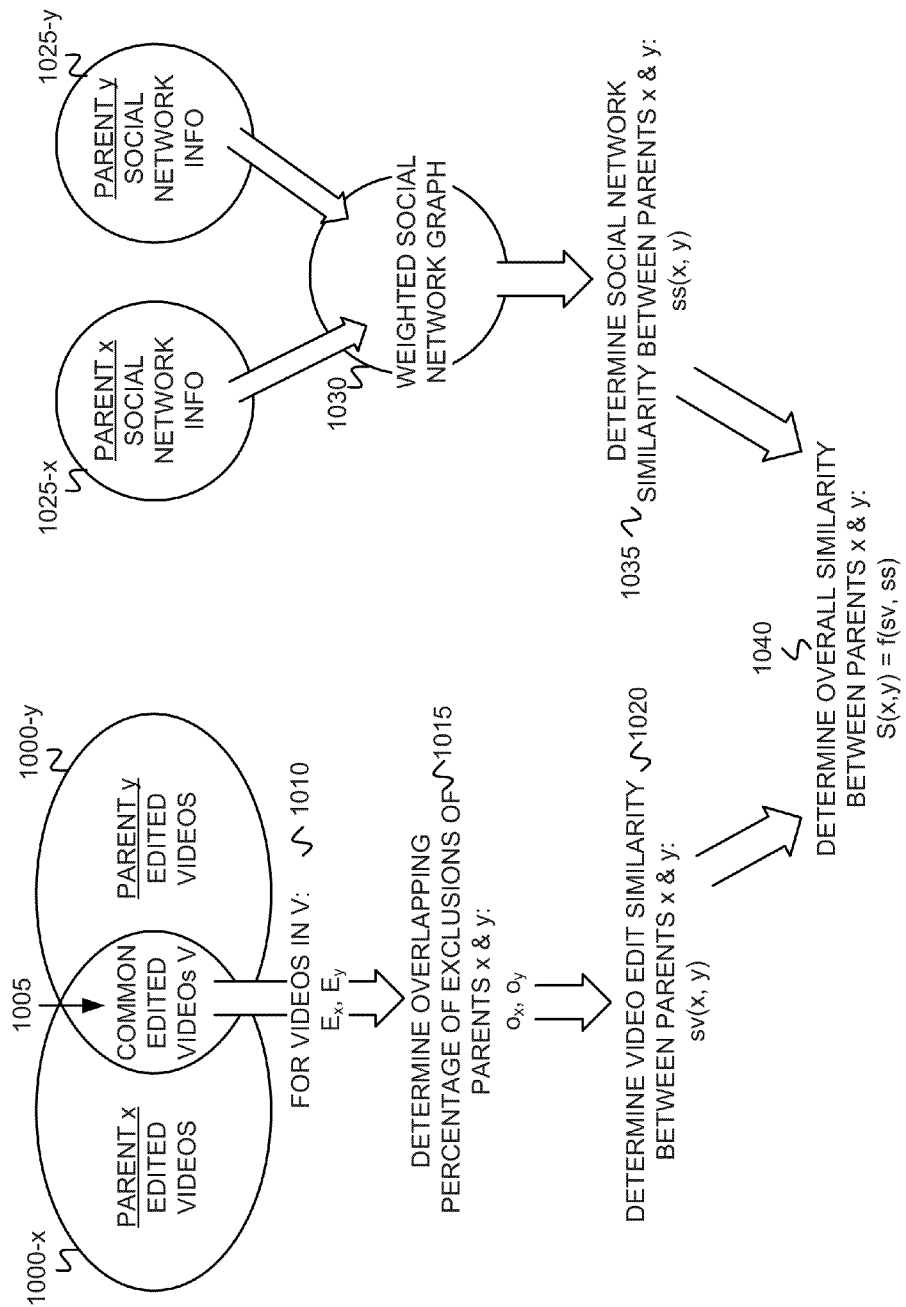

Content management server 210 may determine a list of common videos (V) that have been watched and edited/censored by both parent x and parent y, in which parent y is a parent in set P (block 810). Through analysis of media DB 150, a set 1000-x of edited/censored videos for parent x, and a set 1000-y of edited/censored videos for parent y, may be determined, as depicted in FIG. 10A. As further shown in FIG. 10A, an intersection of set 1000-x and set 1000-y may be determined to obtain a list of common videos (V) 1005 that includes the same videos that have edited/censored by both parent x and parent y.

Content management server 210 may, for the common videos in V, obtain exclusions $E_y$ added by parent y and exclusions $E_x$ added by parent x (block 815). Exclusions $E_y$ includes a set of exclusions added to the videos in the list of common videos by parent y. Exclusions $E_x$ includes a set of exclusions added to the videos in the list of common videos V by parent x. Content management server 210 may access and retrieve cut profiles for each video in V, to obtain the exclusions for each video in the list of common videos V for both parent x and parent y, from media DB 150. FIG. 10A depicts exclusions $E_x$ and $E_y$ 1010 being obtained for the videos in the list of common videos V 1005.

Content management server 210 may let $E = E_x \cap E_y$ be the identical exclusions from $E_x$ and $E_y$, and may determine the overlapping percentage of exclusions of parent x ($o_x$) and parent y ($o_y$) (block 820):

$$o_x = \frac{\sum_{e \in E} \text{length}(e)}{\sum_{d \in E_x} \text{length}(d)} \qquad \text{Eqn. (1)}$$

where:

e is an exclusion (i.e., a portion of deleted video) in the set of identical exclusions E, d is an exclusion (i.e., a portion of deleted video) in the set of exclusions from $E_x$ for parent x, length (e) is a length of an individual exclusion e (e.g., in seconds), and length (d) is a length of an individual exclusion d (e.g., in seconds).

$$o_y = \frac{\sum_{e \in E} \text{length}(e)}{\sum_{f \in E_y} \text{length}(f)} \qquad \text{Eqn. (2A)}$$

where:

f is an exclusion (i.e., a portion of deleted video) in the set of exclusions from $E_y$ for parent y, and length (f) is a length of an individual exclusion f (e.g., in seconds).

Figure 10B:
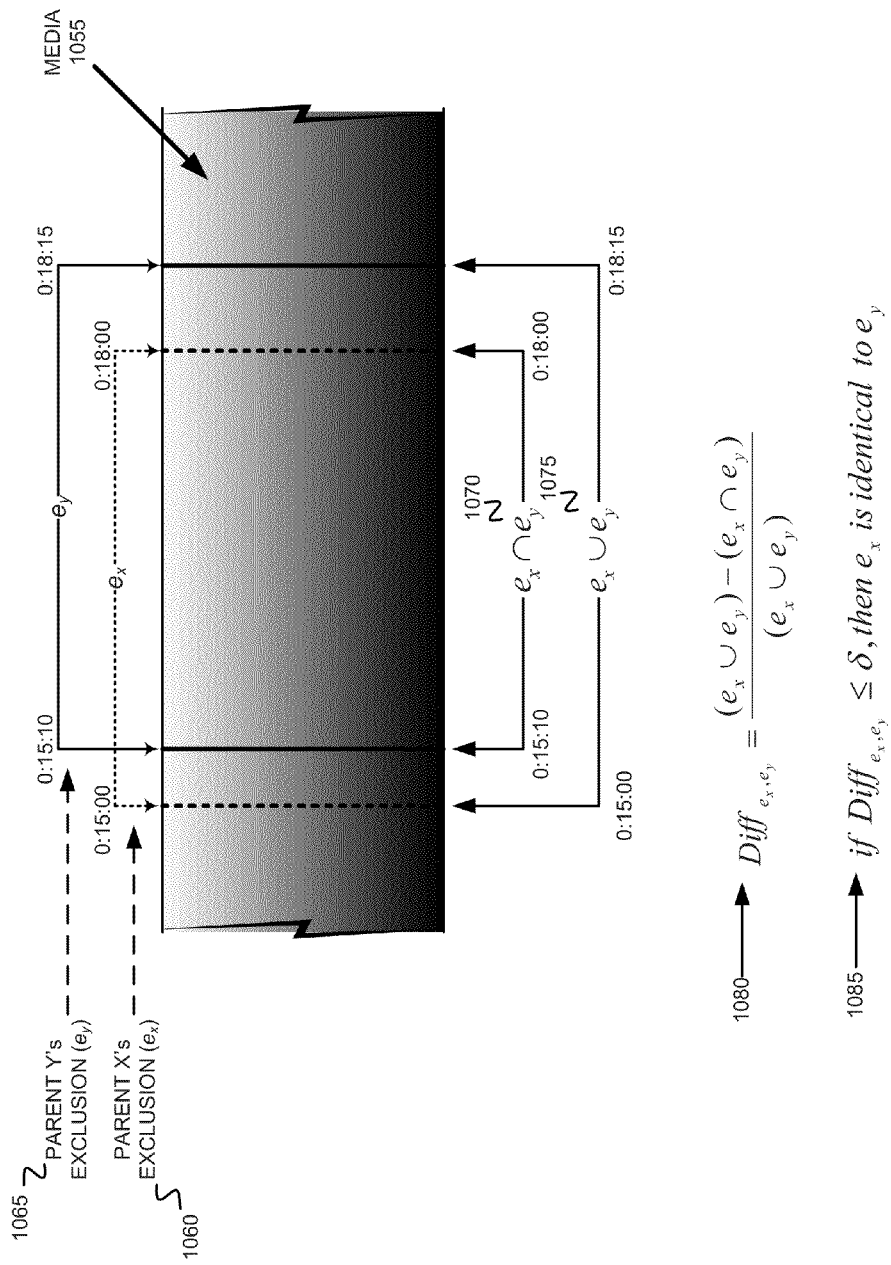

Two individual exclusions from $E_x$ and $E_y$ may be considered to be identical based on, for example, the exemplary exclusion difference determination and threshold comparison technique depicted in FIG. 10B. As shown in FIG. 10B, a portion of media 1055 may have an exclusion $e_x$ 1060 for parent x and an exclusion $e_y$ 1065 for parent y applied to it. Exclusion $e_x$ 1060 may have a start time of 0:15:00 and a stop time of 0:18:00. Exclusion $e_y$ 1065 may have a start time of 0:15:10 and a stop time of 0:18:15. A difference value ($\text{Diff}_{e_x,e_y}$) for exclusions $e_x$ and $e_y$ may be determined using the following equation:

$$\text{Diff}_{e_x,e_y} = \frac{(e_x \cup e_y) - (e_x \cap e_y)}{(e_x \cup e_y)} \qquad \text{Eqn. (2B)}$$

FIG. 10B depicts the intersection 1070 of exclusions $e_x$ and $e_y$ (i.e., the period of media 1055 between time 0:15:10 and 0:18:00), and the union 1075 of exclusions $e_x$ and $e_y$ (i.e., the period of media 1055 between time 0:15:00 and 0:18:15). FIG. 10B further depicts the determination of the difference value $\text{Diff}_{e_x,e_y}$ 1080 based on the intersection 1070 and union 1075 of exclusions $e_x$ and $e_y$. If, as further shown in FIG. 10B, the determined difference value $\text{Diff}_{e_x,e_y}$ 1080 is less than or equal to a threshold value ($\delta$), then exclusion $e_x$ is identified as being identical 1085 to exclusion $e_y$. Using the specific values for start and stop times shown in FIG. 10B for exclusions $e_x$ and $e_y$, the union of exclusions $e_x$ and $e_y$ equals 195 seconds (i.e., 0:18:15–0:15:00=195 seconds) and the intersection of exclusions $e_x$ and $e_y$ equals 170 seconds (0:18:00–0:15:10=170 seconds). The difference value $\text{Diff}_{e_x,e_y}$ then equals (195−170)/195=0.1282. Letting threshold value ($\delta$) equal 0.20, then 0.1282 is less than or equal to 0.20 and exclusions $e_x$ and $e_y$ can be considered to be identical in this example. Different values for $\delta$ may be experimented with to arrive at an optimal value for determining whether two exclusions are identical.

Returning to FIG. 10A, this figure graphically depicts determining 1015 the overlapping percentage of exclusions $o_x$ and $o_y$ of parents x and y. As an illustrative example, assume that parent x and parent y watched and edited 10 common videos V. Parent x had 20 exclusions denoted by $E_x$ for the common videos V, and parent y had 30 exclusions denoted by $E_y$ for the common videos V. Between parent x and parent y, 10 exclusions are identical, representing, for example, the same scene (e.g., excessive violence, extreme language, etc.) in the same video. $o_x$ is the total length of all of the identical exclusions divided by the total length of all exclusions added by parent x. $o_y$ is the total length of all of the identical exclusions divided by the total length of all exclusions added by parent y. The determined values for $o_x$ and $o_y$ represents a measure of how exclusions from parent x and similar to exclusions from parent y and should each equal values equal to or less than one.

Content management server 210 may determine a video editing similarity sv(x,y) between parents x and y (block 825). The similarity sv(x,y) between parent x and parent y can be determined using the Pearson correlation:

$$sv(x,y) = \frac{\sum_{i \in V}(o_{x,i} - \overline{o}_x)(o_{y,i} - \overline{o}_y)}{\sqrt{\sum_{i \in V}(o_{x,i} - \overline{o}_x)^2 \cdot \sum_{i \in V}(o_{y,i} - \overline{o}_y)^2}} \qquad \text{Eqn. (3A)}$$

where:

n is the number of videos in V; and $\overline{o}_x$ and $\overline{o}_y$ denote the average overlapping percentage for parent x and y, respectively, as shown in Eqns. (3B) and (3C).

$$\overline{o}_x = 1/n \Sigma_{i \in V} o_{x,i} \qquad \text{Eqn. (3B)}$$

$$\overline{o}_y = 1/n \Sigma_{i \in V} o_{y,i} \qquad \text{Eqn. (3C)}$$

Alternatively, the video editing similarity sv(x,y) between parent x and parent y may be determined using the vector cosine approach:

$$sv(x,y) = \frac{\sum_{i \in V} o_{x,i} o_{y,i}}{\sqrt{\sum_{i \in V} o_{x,i}^2} \sqrt{\sum_{i \in V} o_{y,i}^2}} \qquad \text{Eqn. (4)}$$

FIG. 10A graphically depicts determining 1020 a video editing similarity sv(x,y) between x and y.

Content management server 210 may obtain social network information for parents x and y (block 830). Content management server 210 may retrieve social network information for parents x and y from social network servers 230, or from client devices 165-1 through 165-*m* when social network information is accessed at those client devices. The social network information may include, for example, other "friends" of parent x and parent y on the social network service, how frequently parents x and parents y interact with other "friends" on the social network service (e.g., chat, leave messages, share content, play games, etc.), an average time spent for each interaction, how many common interests parent x and parent y share between them or with other "friends" in news, games, sports, etc., and data related to an overlap of circles of "friends" between parent x and parent y. FIG. 10A depicts parent x's social network information 1025-*x*, and parent y's social network information 1025-*y* obtained by content management server 210.

Figure 11:
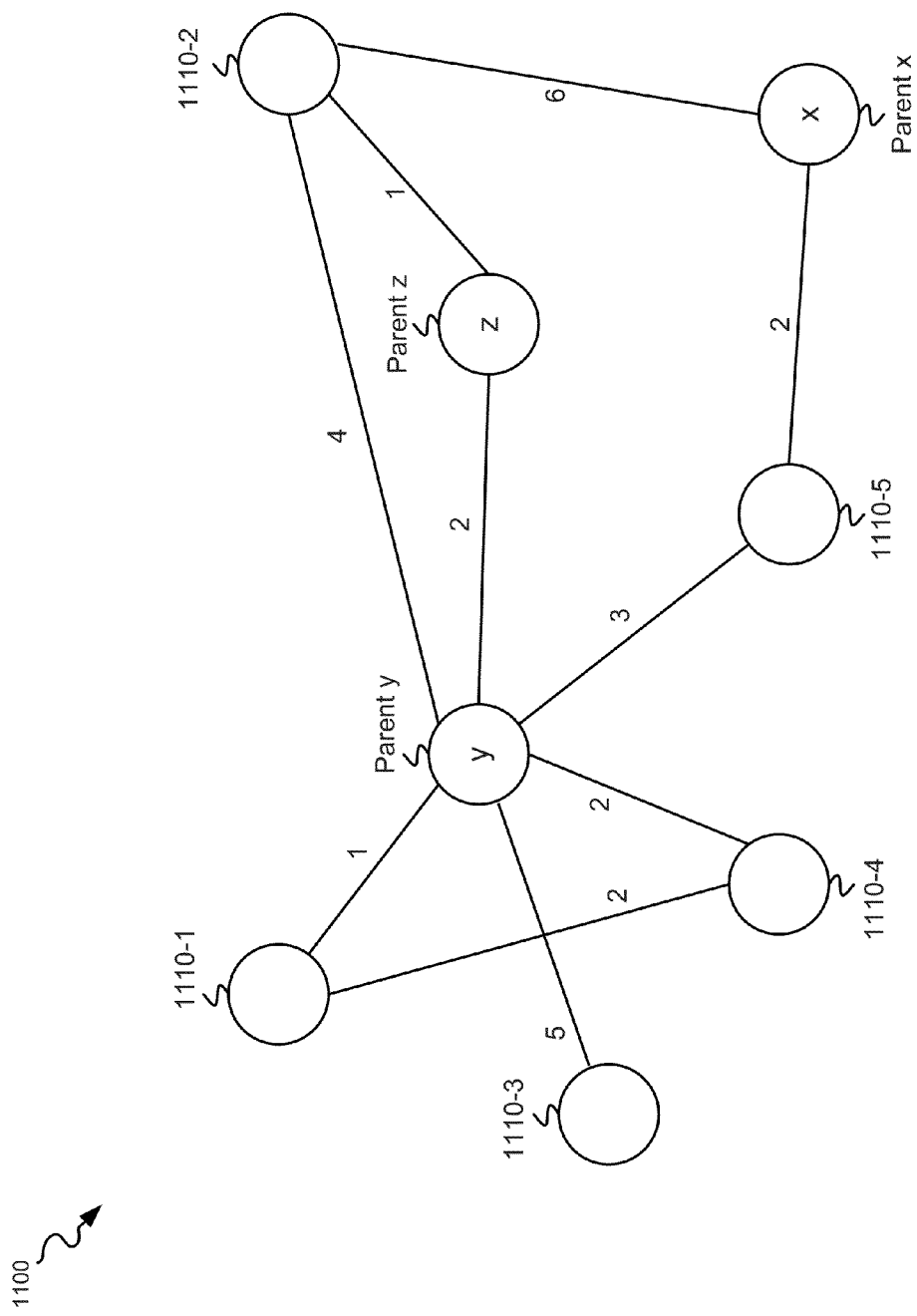

Content management server 210 may construct a weighted social network graph for parents x and y based on the obtained social network information (block 835). FIG. 11 depicts a weight social network graph 1100 according to one example. As shown, social network graph 1100 may include multiple nodes 1110-1 through 1110-5 for various social network "friends" and may also include nodes of parent x, parent y, and other parents (parent z shown). As further shown, each node of social network graph 1100 may connect to one or more other nodes via weighted edges. The various edges between parent and "friend" nodes may be obtained from the social network information, and the weights assigned to each edge of social network graph 1100 may further be determined based on many different factors. The different factors may include, for example, how frequently the parents or "friends" represented by each node interact with each other on a social network service (e.g., chat, leave messages, share content, play games, etc.), an average time spent for each interaction, how many common interests the parents or "friends" represented by each node share between them or with other "friends" in news, games, or sports, etc. FIG. 10A graphically depicts a weighted social network graph 1030 being constructed by content management server 210.

Content management server 210 may determine a social network similarity ss(x,y) between parents x and y (block 840) based on the social network graph constructed in block 835. In one implementation, a cost of a shortest path between parent x and parent y in the social network graph may be determined, and the social network similarity ss(x,y) may be determined based on the following equation:

$$ss(x,y) = 1/\text{cost\_of\_shortest\_path}(x,y) \quad \text{Eqn. (5)}$$

where cost_of_shortest_path(x,y) is a sum of the weights on the lowest cost set of edges between parent x and parent y in the social network graph.

For example, referring to the exemplary social network graph 1100 of FIG. 11, the least cost path between parent x and parent y consists of the edges that connect to node 1110-5. The edge connecting parent x to node 1110-5 has a weight/cost of 2, and the edge connecting parent y to node 1110-5 has a weight/cost of 3, for a total cost of 5, making this path the shortest cost path between parent x and parent y on social network graph 1100. FIG. 10A graphically depicts determining 1035 the social network similarity ss(x,y) between parents x and y.

Content management server 210 may determine an overall similarity s(x,y) between parents x and y (block 845) The overall similarity s(x,y) may be determined as a function of the video editing similarity sv and the social network similarity ss.

$$s(x,y) = f(sv, ss) \quad \text{Eqn. (6)}$$

In one implementation, the function may include a product of sv and ss (i.e., s(x,y)=sv*ss). Other functions, however, may alternatively be used to determine the overall similarity s between parent x and parent y. FIG. 10A graphically depicts determining 1040 an overall similarity between parents x and y by content management server 210. Content management server 210 may store the determined overall similarity s(x,y) between parents x and y (block 850) for future retrieval (as described below with respect to the exemplary process of FIGS. 12A and 12B.

Figure 12A:
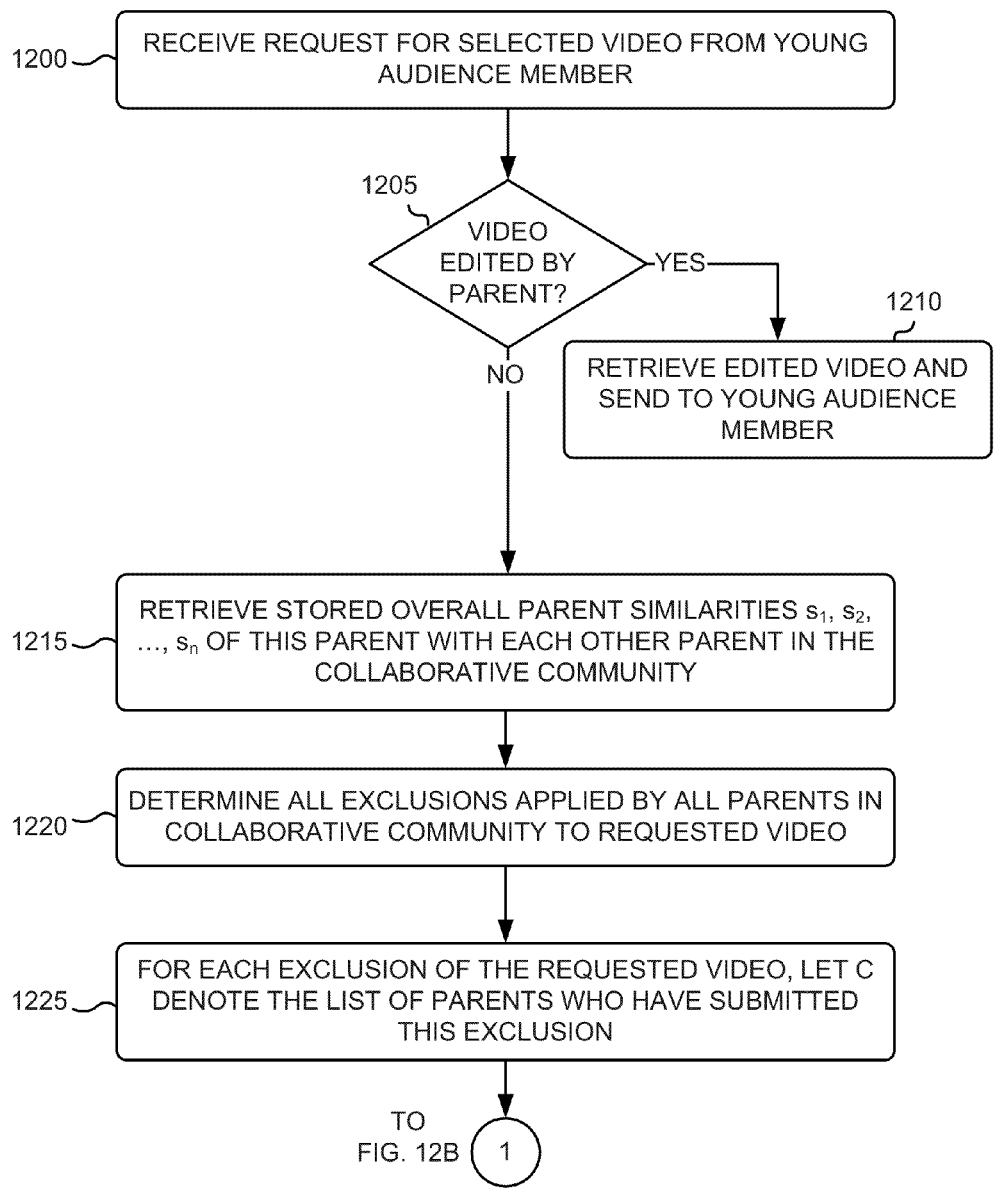
FIGS. 12A and 12B are flow diagrams of an exemplary collaborative filtering process for selectively applying exclusions to a video requested by a young audience member.
Figure 12B:
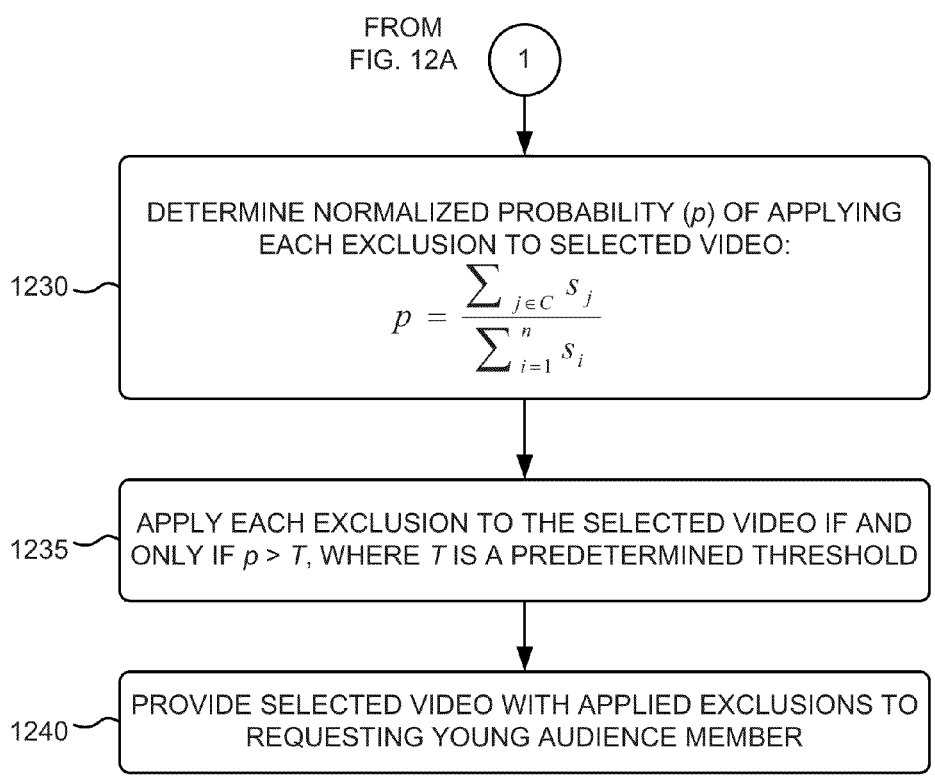

FIGS. 12A and 12B are flow diagrams of an exemplary collaborative filtering process for selectively applying exclusions to a requested video. The exemplary process of FIGS. 12A and 12B may be implemented by content management server 210. The exemplary process of FIGS. 12A and 12B is described below with reference to FIGS. 2 and 13. The description of FIGS. 12A and 12B refers to a "video," meaning a combined audio and video item of media content. However, the exemplary process of FIGS. 12A and 12B may be applied to audio only, or video only, items of media content.

Referring to FIG. 12A, the exemplary process may include receiving a request for a selected video from a young audience member (block 1200). For example, young audience member 170 may select a video 173 from media DB 150 via content delivery network 205 for delivery from streaming media server 220. Content management server 210 may determine if the requested video has been edited/censored by a parent of the young audience member (block 1205). For example, parent x 175 of young audience member 170 may have previously watched and edited/censored the video currently selected by young audience member 170 for viewing. A cut profile, including one or more exclusions, for parent x 175's editing session may be stored in media DB 150 and may be located and retrieved by content management server 210. Young audience member 170 may be identified and mapped to parent x 175. If the requested video has been edited/censored by the parent of the young audience member (YES—block 1205), then content management server 210 may retrieve the parent edited video and provide it to young audience member 170 (block 1210). Delivery of the selected video is described in further detail below with respect to FIGS. 14-17.

If the requested video has not been edited/censored by the parent (NO—block 1205), then content management server 210 may proceed to block 1215 to determine whether to selectively apply exclusions applied by other parents in the collaborative community, of which the young audience member's parent is a member, to the requested video before providing the requesting video to the young audience member. The selective application of the exclusions is described with respect to blocks 1215 through 1235 of FIGS. 12A and 12B (described in detail below).

Content management server 210 may retrieve stored overall parent similarities $\{s_1, s_2, \ldots, s_n\}$ of this parent with each other parent in the collaborative community (block 1215). These overall parent similarities may have been previously determined, and stored in media DB 150, as described above with respect to FIGS. 8A and 8B. As shown in FIG. 13, parent x 175 may retrieve overall similarities $s_1, s_2, \ldots, s_n$ between parent x 175 and each of parents 180-1 through 180-*n* of collaborative community 178. Content management server 210 may determine all exclusions previously applied by all parents in the collaborative community to the requested video (block 1220). Content management server 210 may access media DB 150 and retrieve all cut profiles for the selected video for all of the parents in collaborative community 178. The retrieved cut profiles, as shown in FIG. 13, comprises a set 185 of all exclusions $\{e_1, e_2, \ldots, e_z\}$ previously applied by the parents in collaborative community 178 to selected video 173.

Content management server 210 may, for each exclusion of the requested video, let C denote the list of parents who have submitted this exclusion (block 1225) and may determine a normalized probability (p) of applying each exclusion to the selected video (block 1230) based on the following:

$$p = \frac{\sum_{j \in C} s_j}{\sum_{i=1}^{n} s_i} \qquad \text{Eqn. (7)}$$

where:

$s_1, s_2, \ldots, s_n$ is a similarity value between this parent (e.g., parent x) and each other parent (e.g., parents 180-1 through 180-n) in the collaborative community, j is a parent in the list of parents C who have submitted this exclusion (summed over all parents in C), and n is the total number of parents in the collaborative community.

FIG. 13 depicts the determination 1300 of the normalized probability p of applying each exclusion in set 185 to selected video 173 based on similarities $\{s_1, s_2, \ldots, s_n\}$ between parent x 175 and each of parents 180-1 through 180-n.

Content management server 210 may apply each exclusion to the selected video if and only if p>T, where T is a predetermined threshold (block 1235). T may include a configurable threshold value that may, for example, be specified by an operator or administrator associated with content management server 210. After determining the normalized probability for each exclusion using Eqn. (7), the normalized probability p may be compared with the threshold T and if p is greater than T, then that exclusion may be applied to the video selected by the young audience member. FIG. 13 depicts the application 1310 of each exclusion in set 185 to selected video 173 if the normalized probability p is greater than T. For example, FIG. 13 depicts exclusions $e_1$, $e_5$ and $e_{11}$ being applied to selected video 173. Content management server 210 may provide the selected video with the applied exclusions to the requesting young audience member (block 1240). Provision of the selected video to the requesting young audience member is described in further detail below with respect to FIGS. 14-17.

Figure 14:
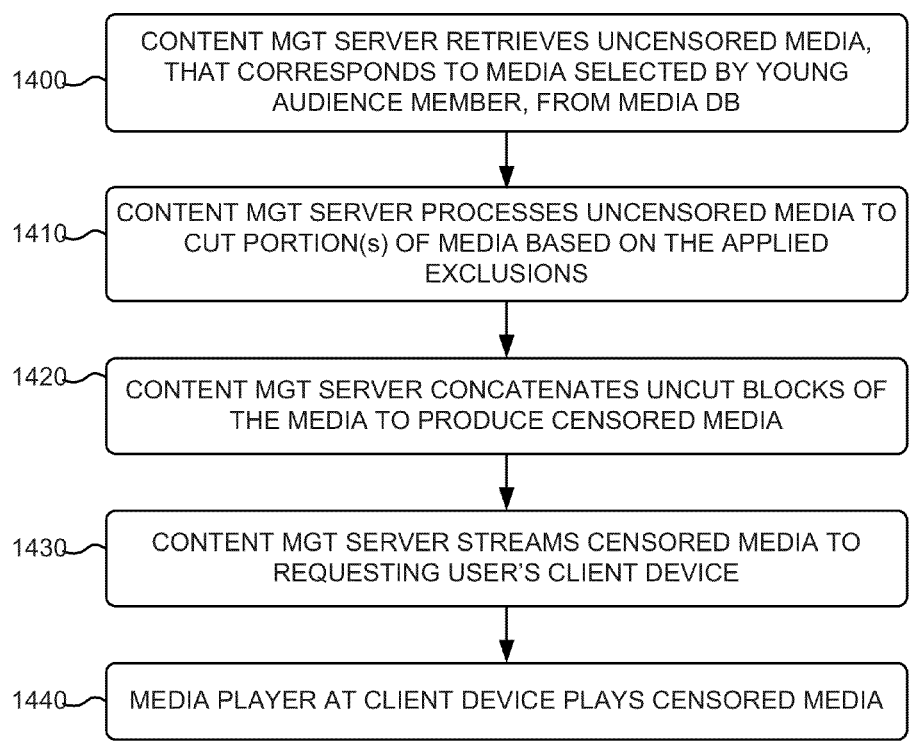
FIG. 14 is a flow diagram of a first exemplary process for the application of exclusions, determined in the exemplary process of FIGS. 12A and 12B, to a selected item of video.

FIG. 14 is a flow diagram of a first exemplary process for the application of exclusions, determined in the exemplary process of FIGS. 12A and 12B above, to a selected item of video. The exemplary process of FIG. 14 may, in one embodiment, be implemented by content management server 210, in conjunction with media DB 150 and/or client device 165. In another embodiment, the exemplary process of FIG. 14 may be implemented by streaming media server 220, in conjunction with content management server 210, media DB 150 and/or client device 165. The exemplary process of FIG. 14 is described below with reference to FIGS. 2 and 15.

Figure 15:
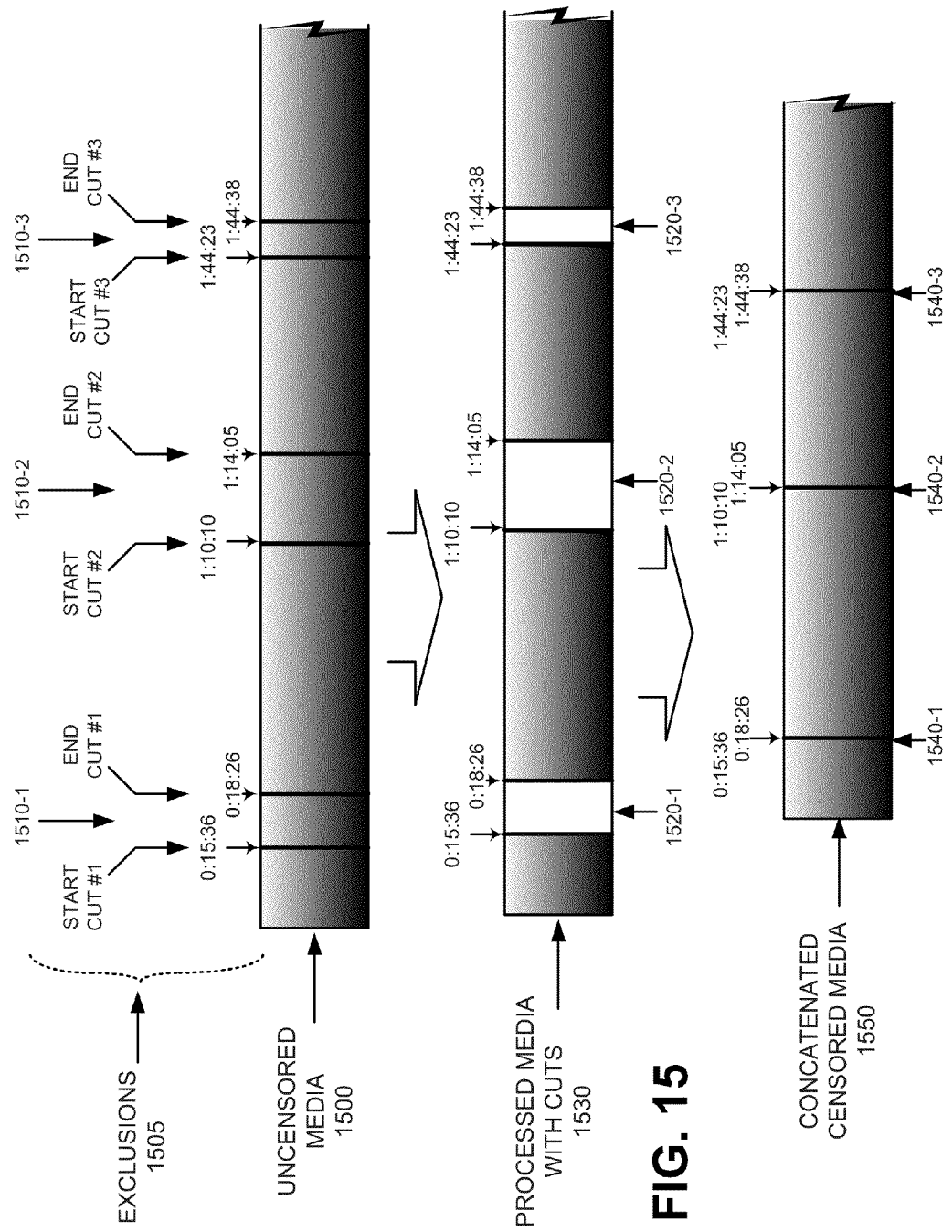
FIG. 15 is a diagram that depicts an example of the censoring of media based on the exclusions from the exemplary process of FIG. 14.

Referring to FIG. 14, the exemplary process may include content management server 210 retrieving uncensored media, which corresponds to the media selected by the young audience member (e.g., in block 1200 above), from media DB 150 (block 1400). FIG. 15 depicts uncensored media 1500 that has been retrieved from media DB 150, along with the exclusions 1505, determined to be applied to media 1500 in the exemplary process of FIGS. 12A and 12B. As shown in FIG. 15, exclusions 1505 includes multiple different portions of content 1510-1, 1510-2 and 1510-3 to be censored (only three shown for the sake of simplicity), each defined by a censoring start time (start cut) and a censoring stop time (stop cut).

Content management server 210 may process the uncensored media to cut a portion(s) of the media based on the applied exclusions (block 1410). As shown in FIG. 15, content management server 210 may remove the different portions of content 1510-1, 1510-2 and 1510-3 from uncensored media 1500, that correspond to the exclusions 1505, to produce a processed media with censored cuts 1530 that includes censored portions 1520-1, 1520-2 and 1520-3 of media 1500. For example, portion 1510-1 of media 1500 spanning from start time 0:15:36 to stop time 0:18:26 along the timeline of media 1500 is removed, portion 1510-2 of media 1500 spanning from start time 1:10:10 to stop time 1:14:05 along the timeline of media 1500 is removed, and portion 1510-3 of media 1500 spanning from start time 1:44:23 to stop time 1:44:38 along the timeline of media 1500 is removed. Content management server 210 may concatenate uncut blocks of the media to produce a censored version of the selected media (block 1420). As shown in FIG. 15, the censored portions 1520-1, 1520-2 and 1520-3 of media 1500 may be removed from processed media 1530 such that the gaps in the timeline of media 1500 created by removal of portions 1510-1, 1510-2 and 1510-3 are eliminated to produce concatenated censored media 1550. For example, as shown in FIG. 15, censored portion 1520-1 is removed from the data of media 1500 such that the censoring start time of 0:15:36 is coincident with the censoring stop time of 0:18:26, leaving no discernible gap in the media from the standpoint of a viewing user.

Content management server 210 may stream the censored media to a requesting user's client device (block 1430). In one embodiment, content management server 210 may stream censored media 1550 directly to the requesting user's client device 165. In another embodiment, content management server 210 may supply the censored media 1550 to streaming media server 220 which, in turn, may send censored media 1550 to the requesting user's client device 165. Media player 105, at the requesting user's client device 165, may play the censored media as it is streamed to client device 165 via CDN 205 (block 1440).

The exemplary process of FIG. 14 may be repeated for each item of media selected by a young audience member and delivered to the young audience member.

Figure 16:
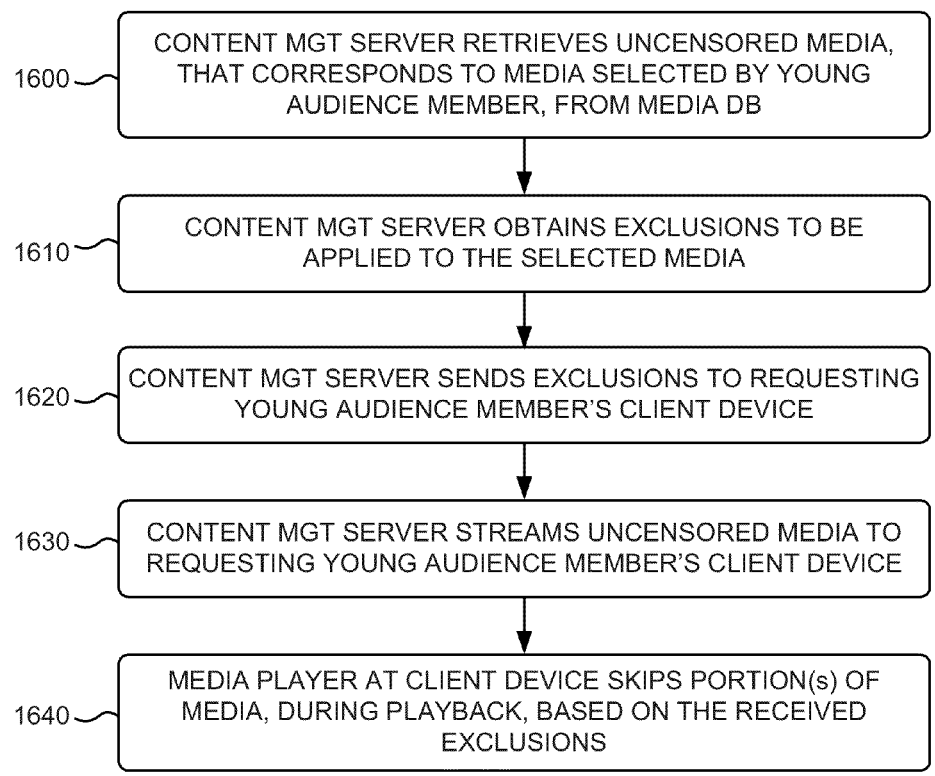
FIG. 16 is a flow diagram of a second exemplary process for the application of exclusions, determined in the exemplary process of FIGS. 12A and 12B, to a selected item of video.

FIG. 16 is a flow diagram of a second exemplary process for the application of exclusions, determined in the exemplary process of FIGS. 12A and 12B above, to a selected item of video. The exemplary process of FIG. 16 may, in one embodiment, be implemented by content management server 210, in conjunction with media DB 150 and/or client device 165. In another embodiment, the exemplary process of FIG. 16 may be implemented by streaming media server 220, in conjunction with content management server 210, media DB 150 and/or client device 165. The exemplary process of FIG. 16 is described below with reference to FIGS. 2 and 17.

Figure 17:
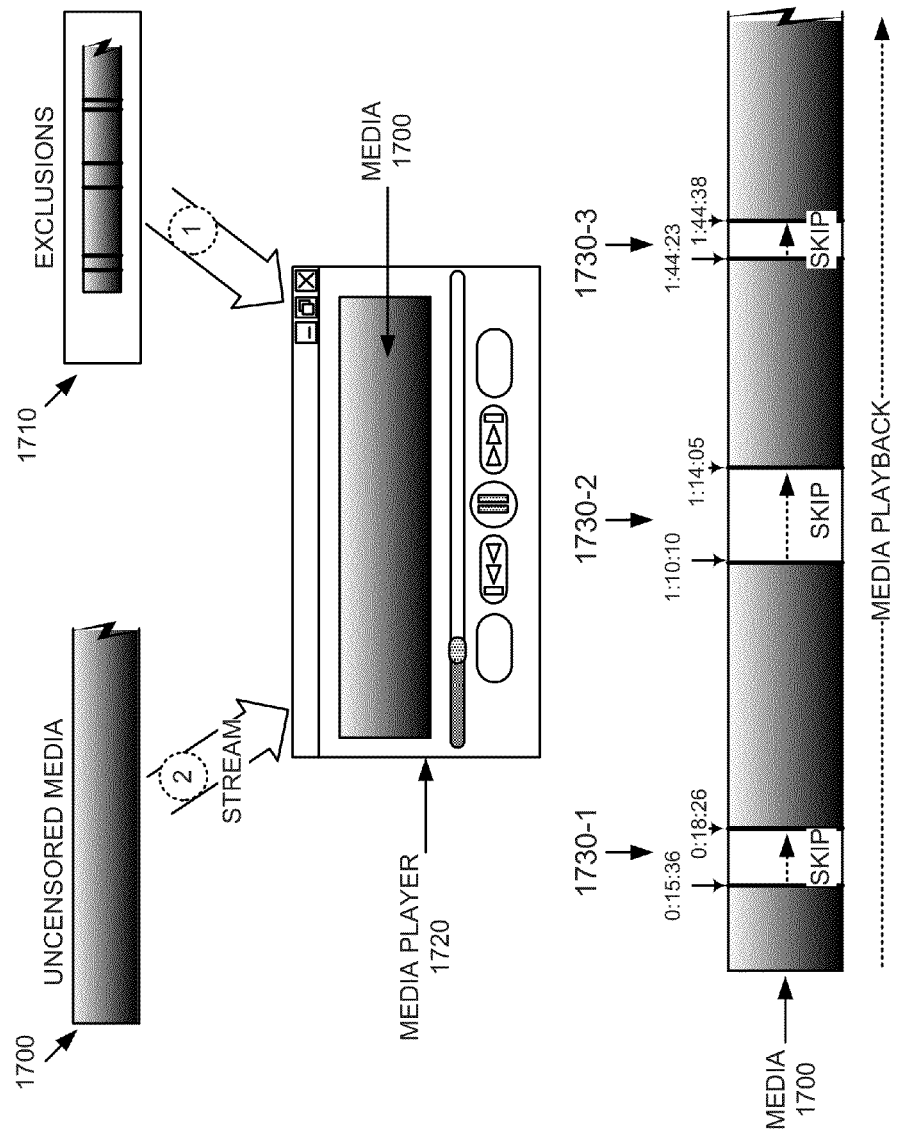
FIG. 17 is a diagram that depicts an example of the censoring of media based on the exclusions of the exemplary process of FIG. 16.

Referring to FIG. 16, the exemplary process may include content management server 210 retrieving uncensored media, that corresponds to media selected by a young audience member (e.g., in block 1200 above), from media DB 150 (block 1600) and obtaining exclusions to be applied to the selected media (block 1610). FIG. 17 depicts media 1700 retrieved from media DB 150 (not shown), and associated exclusions 1710 (e.g., determined from the exemplary process of FIGS. 12A and 12B).

Content management server 210 may send the exclusions to the requesting young audience member's client device 165 (block 1620). FIG. 17 depicts exclusions 1710 being sent (identified with a "1") to media player 1720 at the requesting young audience member's client device (not shown). Content management server 210 may stream the uncensored media to the requesting young audience member's client device 165 (block 1630). FIG. 17 depicts media 1700 being streamed (identified with a "2") to media player 1720 at the requesting young audience member's client device (not shown).

Media player 105, at the requesting young audience member's client device 165, may skip a portion(s) of media, during playback, based on the received exclusions (block 1640). As shown in FIG. 17, during playback of media 1700, media player 1720 may skip the playback of each portion 1730-1, 1730-2 and 1730-2 of media 1700 marked with a censoring start time and censoring stop time from exclusions 1710. For example, during playback of portion 1730-1 of media 1700 marked with a censoring start time of 0:15:36 and a censoring stop time of 0:18:26, media player 1720 instantaneously skips the playback from 0:15:36 to 0:18:26, thus, omitting the first portion of media intended to be censored.

Exemplary embodiments described herein include collaborative filtering techniques for selectively censoring media requested by a user (e.g., a young audience member) using individualized censoring of media content previously performed by members of a collaborative community. Using the collaborative filtering techniques described herein, exclusions $e_1$ through $e_z$ previously applied to a single item of media by multiple parents in the collaborative community may be selectively applied to the single item of media when requested for playback. The exclusions may be selectively applied to the single item of media based on media editing similarities and social network similarities between a parent of a requesting young audience member, and other parents in the collaborative community.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 5A, 5B, 8A, 8B, 12A, 12B, 14 and 16, the order of the blocks may be varied in other implementations. Moreover, non-dependent blocks may be performed in parallel. Implementations have been described herein as being used for collaborative filtering techniques for applying exclusions to streaming media. However, the collaborative filtering techniques described herein may also be used to selectively apply exclusions to TV programs or movies stored locally on DVRs that are connected to a network. A "young audience member" has been referred to herein with respect to a parent. The "young audience member" may include a child of the parent, or it may include another user that is viewing content via another user's content delivery account (e.g., one user has a content delivery account, with a corresponding media editing/censoring history, and another user logs in under the one user's content delivery account).

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   determining, by a device, a list of common videos (V) that have been censored by both of a user x and a user y;
   obtaining, by the device, for each video in the list of common videos, exclusions ($E_x$) added to the video by user x and exclusions ($E_y$) added to the video by user y, wherein each of the exclusions comprises a portion of one of the common videos (V) identified for censoring by user x or user y;
   identifying, by the device, identical exclusions between the exclusions added by user x and the exclusions added by user y;
   determining, by the device, a video censoring similarity (sv(x,y)) between user x and user y based on a length of the identified identical exclusions, a length of exclusions added by user x, and a length of exclusions added by user y;
   receiving, at the device, a selection of a video from the list of common videos (V) from a video audience member associated with user x; and
   using, by the device, the video censoring similarity as a basis for applying one or more of the exclusions added by user y to the selected video before sending the video to the video audience member.

2. The method of claim 1, further comprising:
   obtaining, by the device, social network information associated with user x and user y;
   determining, by the device, a social network similarity ss(x,y) between user x and user y based on the obtained social network information; and
   using, by the device, the social network similarity as a further basis for applying the one or more of the exclusions added by user y to the selected video before sending the video to the video audience member.

3. The method of claim 2, further comprising:
   constructing, by the device, one or more social network graphs for user x and user y based on the obtained social network information associated with user x and user y, wherein determining the social network similarity ss(x,y) between user x and user y is further based on the constructed one or more social network graphs.

4. The method of claim 2, further comprising:
   determining, by the device, an overall similarity (s(x,y)) between user x and user y as a function of the video censoring similarity and the social network similarity; and
   using, by the device, the overall similarity (s(x,y)) between user x and user y as a further basis for applying the one or more of the exclusions added by user y to the selected video before sending the video to the video audience member.

5. The method of claim 4, further comprising:
   determining, by the device, a probability of applying each of the exclusions to the selected video based on the determined overall similarity (s(x,y)); and
   selectively, by the device, applying each of the exclusions to the selected video based on the determined probability.

6. The method of claim 5, wherein selectively applying each of the exclusions to the selected video comprises:
   comparing, by the device, the determined probability with a predetermined threshold value to determine whether to apply each of the exclusions to the selected video.

7. The method of claim 1, wherein identifying the identical exclusions between the exclusions added by user x and the exclusions added by user y comprises:
   determining, by the device, pairs of the exclusions added by user x and user y that are less than a threshold δ to identify the identical exclusions.

8. A network device, comprising:
   a processing unit configured to:
      determine a list of common videos (V) that have been censored by both of a user x and a user y,
      obtain for each video in the list of common videos, exclusions ($E_x$) added to the video by user x and exclusions ($E_y$) added to the video by user y, wherein each of the exclusions comprises a portion of one of the common videos (V) identified for censoring by user x or user y,
      identify identical exclusions between the exclusions added by user x and the exclusions added by user y, and
      determine a video censoring similarity (sv(x,y)) between user x and user y based on a length of the identified identical exclusions, a length of exclusions added by user x, and a length of exclusions added by user y; and
   a communication interface, coupled to a network and configured to receive a selection of a video from the list of common videos (V) from a video audience member associated with the user x,
   wherein the processing unit is further configured to:
      use the video censoring similarity as a basis for applying one or more of the exclusions added by user y to the selected video before sending the video to the video audience member.

9. The network device of claim 8, wherein the processing unit is further configured to:
   obtain social network information associated with user x and user y,
   determine a social network similarity ss(x,y) between user x and user y based on the obtained social network information, and
   use the social network similarity as a further basis for applying the one or more of the exclusions added by user y to the selected video before sending the video to the video audience member.

10. The network device of claim 9, wherein the processing unit is further configured to:
   construct one or more social network graphs for user x and user y based on the obtained social network information associated with user x and user y,
   wherein determining the social network similarity ss(x,y) between user x and user y is further based on the constructed one or more social network graphs.

11. The network device of claim 9, wherein the processing unit is further configured to:
   determine an overall similarity (s(x,y)) between user x and user y as a function of the video censoring similarity and the social network similarity, and
   use the overall similarity (s(x,y)) between user x and user y as a further basis for applying the one or more of the exclusions added by user y to the selected video before sending the video to the video audience member.

12. The network device of claim 11, wherein the processing unit is further configured to:
   determine a probability of applying each of the exclusions to the selected video based on the determined overall similarity (s(x,y)), and
   selectively apply each of the exclusions to the selected video based on the determined probability.

13. The network device of claim 12, wherein, when selectively applying each of the exclusions to the selected video, the processing unit is configured to:
   compare the determined probability with a predetermined threshold value to determine whether to apply each of the exclusions to the selected video.

14. The network device of claim 8, wherein, when identifying the identical exclusions between the exclusions added by user x and the exclusions added by user y, the processing unit is configured to:
   determine pairs of the exclusions added by user x and user y that are less than a threshold δ to identify the identical exclusions.

15. A non-transitory computer-readable medium storing instructions executable by at least one processing unit, the computer-readable medium comprising:
   one or more instructions for determining a list of common videos (V) that have been censored by both of a user x and a user y;
   one or more instructions for obtaining for each video in the list of common videos, exclusions ($E_x$) added to the video by user x and exclusions ($E_y$) added to the video by user y, wherein each of the exclusions comprises a portion of one of the common videos (V) identified for censoring by user x or user y;
   one or more instructions for identifying identical exclusions between the exclusions added by user x and the exclusions added by user y;
   one or more instructions for determining a video censoring similarity (sv(x,y)) between user x and user y based on a length of the identified identical exclusions, a length of exclusions added by user x, and a length of exclusions added by user y;
   one or more instructions for receiving a selection of a video from the list of common videos (V) from a video audience member associated with user x; and
   one or more instructions for using the video censoring similarity as a basis for applying one or more of the exclusions added by user y to the selected video before sending the video to the video audience member.

16. The non-transitory computer-readable medium of claim 15, further comprising:
   one or more instructions for obtaining social network information associated with user x and user y;
   one or more instructions for determining a social network similarity ss(x,y) between user x and user y based on the obtained social network information; and
   one or more instructions for using the social network similarity as a further basis for applying the one or more of the exclusions added by user y to the selected video before sending the video to the video audience member.

17. The non-transitory computer-readable medium of claim 16, further comprising:

one or more instructions for constructing one or more social network graphs for user x and user y based on the obtained social network information associated with user x and user y, wherein determining the social network similarity ss(x,y) between user x and user y is further based on the constructed one or more social network graphs.

18. The non-transitory computer-readable medium of claim 16, further comprising:

one or more instructions for determining an overall similarity (s(x,y)) between user x and user y as a function of the video censoring similarity and the social network similarity; and one or more instructions for using the overall similarity (s(x,y)) between user x and user y as a further basis for applying the one or more of the exclusions added by user y to the selected video before sending the video to the video audience member.

19. The non-transitory computer-readable medium of claim 18, further comprising:

one or more instructions for determining a probability of applying each of the exclusions to the selected video based on the determined overall similarity (s(x,y)); and one or more instructions for selectively applying each of the exclusions to the selected video based on the determined probability.

20. The non-transitory computer-readable medium of claim 19, wherein selectively applying each of the exclusions to the selected video comprises:

one or more instructions for comparing the determined probability with a predetermined threshold value to determine whether to apply each of the exclusions to the selected video.

21. The non-transitory computer-readable medium of claim 15, wherein the one or more instructions for identifying the identical exclusions between the exclusions added by user x and the exclusions added by user y further comprises:

one or more instructions for determining pairs of the exclusions added by user x and user y that are less than a threshold $\delta$ to identify the identical exclusions.

* * * * *